(12) United States Patent
Donnelly et al.

(10) Patent No.: US 7,349,797 B2
(45) Date of Patent: Mar. 25, 2008

(54) EMISSION MANAGEMENT FOR A HYBRID LOCOMOTIVE

(75) Inventors: Frank Wegner Donnelly, North Vancouver (CA); Douglas W. Swartz, Lakewood, CO (US); John David Watson, Evergreen, CO (US)

(73) Assignee: Railpower Technologies Corp, North Vancouver (CA)

( * ) Notice: Subject to any disclaimer, the term of this patent is extended or adjusted under 35 U.S.C. 154(b) by 491 days.

(21) Appl. No.: 11/095,036

(22) Filed: Mar. 30, 2005

(65) Prior Publication Data

US 2005/0251299 A1 Nov. 10, 2005

Related U.S. Application Data

(60) Provisional application No. 60/558,077, filed on Mar. 30, 2004.

(51) Int. Cl.
*G06F 17/00* (2006.01)
*B61C 5/00* (2006.01)
(52) U.S. Cl. .................. 701/115; 701/19; 105/62.1
(58) Field of Classification Search ........... 701/115, 701/102, 19; 105/62.1
See application file for complete search history.

(56) References Cited

U.S. PATENT DOCUMENTS

| | | | |
|---|---|---|---|
| 384,580 A | 6/1888 | Julien |
| 744,187 A | 11/1903 | Gibbs |
| 1,199,752 A | 10/1916 | Baker |
| 1,377,087 A | 5/1921 | Manns |
| 1,535,175 A | 4/1925 | Mancha |
| 2,403,933 A | 4/1946 | Lillquist |
| 2,472,924 A | 6/1949 | Schwendner |
| 2,510,753 A | 6/1950 | Multhaup |
| 2,704,813 A | 3/1955 | Stamm |
| 3,169,733 A | 2/1965 | Barrett, Jr. |
| 3,443,115 A | 5/1969 | Timmerman, Jr. |
| 3,569,810 A | 3/1971 | Thiele |
| 3,596,154 A | 7/1971 | Gurwicz et al. |
| 3,668,418 A | 6/1972 | Godard |
| 3,728,596 A | 4/1973 | Hermansson et al. |

(Continued)

FOREIGN PATENT DOCUMENTS

CA 1283472 10/1987

(Continued)

OTHER PUBLICATIONS

Supplemental Declaration for Frank Donnelly Under 37 CFR§ 1.98; dated Jan. 25, 2007 for U.S. Appl. No. 11/070,848, 2 pages.

(Continued)

*Primary Examiner*—Hieu T. Vo
(74) *Attorney, Agent, or Firm*—Robic

(57) ABSTRACT

A locomotive is provided that includes:
a receiver operable to receiving a locating signal, the locating signal indicating a current spatial location of a selected locomotive and
a processor operable to (a) determine that the selected locomotive has entered, is entering, and/or is about to enter a spatial zone having at least one controlled parameter, the controlled parameter being at least one of a fuel combustion emissions level and a noise level and (b) configure the operation of the selected locomotive to comply with the controlled parameter.

35 Claims, 21 Drawing Sheets

U.S. PATENT DOCUMENTS

| | | |
|---|---|---|
| 3,737,745 A | 6/1973 | Chevaugeon et al. |
| 3,792,327 A | 2/1974 | Waldorf |
| 3,832,625 A | 8/1974 | Gyugyi |
| 3,898,937 A | 8/1975 | Johnson |
| 3,919,948 A | 11/1975 | Kademann |
| 3,930,189 A | 12/1975 | Smith |
| 3,970,160 A | 7/1976 | Nowick |
| 3,982,164 A | 9/1976 | de Buhr |
| 3,997,822 A | 12/1976 | Logston et al. |
| 4,035,698 A | 7/1977 | Soderberg |
| 4,070,562 A | 1/1978 | Kuno et al. |
| 4,075,538 A | 2/1978 | Plunkett |
| 4,090,577 A | 5/1978 | Moore |
| 4,095,147 A | 6/1978 | Mountz |
| 4,096,423 A | 6/1978 | Bailey et al. |
| 4,107,402 A | 8/1978 | Dougherty et al. |
| 4,152,758 A | 5/1979 | Bailey et al. |
| 4,199,037 A | 4/1980 | White |
| 4,204,143 A | 5/1980 | Coleman |
| 4,217,527 A | 8/1980 | Bourke et al. |
| 4,284,936 A | 8/1981 | Bailey et al. |
| 4,309,645 A | 1/1982 | De Villeneuve |
| 4,344,139 A | 8/1982 | Miller et al. |
| 4,347,569 A | 8/1982 | Allen, Jr. et al. |
| 4,369,397 A | 1/1983 | Read |
| 4,417,194 A | 11/1983 | Curtiss et al. |
| 4,423,362 A | 12/1983 | Konrad et al. |
| 4,471,276 A | 9/1984 | Cudlitz |
| 4,471,421 A | 9/1984 | Brown et al. |
| 4,495,449 A | 1/1985 | Black et al. |
| 4,498,016 A | 2/1985 | Earleson et al. |
| 4,523,134 A | 6/1985 | Kinoshita et al. |
| 4,644,232 A | 2/1987 | Nojiri et al. |
| 4,700,283 A | 10/1987 | Tsutsui et al. |
| 4,701,682 A | 10/1987 | Hirotsu et al. |
| 4,719,861 A | 1/1988 | Savage et al. |
| 4,799,161 A | 1/1989 | Hirotsu et al. |
| 4,896,090 A | 1/1990 | Balch et al. |
| 4,900,944 A | 2/1990 | Donnelly |
| 4,936,610 A | 6/1990 | Kumar et al. |
| 4,941,099 A | 7/1990 | Wood et al. |
| 4,944,539 A | 7/1990 | Kumar et al. |
| 4,950,964 A | 8/1990 | Evans |
| 4,961,151 A | 10/1990 | Early et al. |
| 5,129,328 A | 7/1992 | Donnelly |
| 5,212,431 A | 5/1993 | Origuchi et al. |
| 5,264,764 A | 11/1993 | Kuang |
| 5,281,900 A | 1/1994 | Park |
| 5,289,093 A | 2/1994 | Jobard |
| 5,306,972 A | 4/1994 | Hokanson et al. |
| 5,317,669 A | 5/1994 | Anderson et al. |
| 5,331,261 A | 7/1994 | Brown et al. |
| 5,332,630 A | 7/1994 | Hsu |
| 5,343,970 A | 9/1994 | Severinsky |
| 5,359,228 A | 10/1994 | Yoshida |
| 5,376,868 A | 12/1994 | Toyoda et al. |
| 5,392,716 A | 2/1995 | Orschek et al. |
| 5,424,948 A | 6/1995 | Jordan, Jr. |
| 5,428,538 A | 6/1995 | Ferri |
| 5,436,538 A | 7/1995 | Garvey et al. |
| 5,436,540 A | 7/1995 | Kumar |
| 5,436,548 A | 7/1995 | Thomas |
| 5,453,672 A | 9/1995 | Avitan |
| 5,480,220 A | 1/1996 | Kumar |
| 5,508,924 A | 4/1996 | Yamashita |
| 5,510,203 A | 4/1996 | Hamada et al. |
| 5,510,693 A | 4/1996 | Theobald |
| 5,511,749 A | 4/1996 | Horst et al. |
| 5,528,148 A | 6/1996 | Rogers |
| 5,564,795 A | 10/1996 | Engle |
| 5,568,023 A | 10/1996 | Grayer et al. |
| 5,580,677 A | 12/1996 | Morishita et al. |
| 5,580,685 A | 12/1996 | Schenk et al. |
| 5,585,706 A | 12/1996 | Avitan |
| 5,589,743 A | 12/1996 | King |
| 5,610,499 A | 3/1997 | Rogers |
| 5,610,819 A | 3/1997 | Mann et al. |
| 5,629,567 A | 5/1997 | Kumar |
| 5,629,596 A | 5/1997 | Iijima et al. |
| 5,629,601 A | 5/1997 | Feldstein |
| 5,631,532 A | 5/1997 | Azuma et al. |
| 5,646,510 A | 7/1997 | Kumar |
| 5,659,240 A | 8/1997 | King |
| 5,661,378 A | 8/1997 | Hapeman |
| 5,677,610 A | 10/1997 | Tanamachi et al. |
| 5,685,507 A | 11/1997 | Horst et al. |
| 5,696,438 A | 12/1997 | Hamilton |
| 5,698,955 A | 12/1997 | Nii |
| 5,710,699 A | 1/1998 | King et al. |
| 5,735,215 A | 4/1998 | Tegeler |
| 5,751,137 A | 5/1998 | Kiuchi et al. |
| 5,765,656 A | 6/1998 | Weaver |
| 5,820,172 A | 10/1998 | Brigham et al. |
| 5,856,037 A | 1/1999 | Casale et al. |
| 5,898,281 A | 4/1999 | Bossoney et al. |
| 5,898,282 A | 4/1999 | Drozdz et al. |
| 5,939,861 A | 8/1999 | Joko et al. |
| 5,964,309 A | 10/1999 | Kimura et al. |
| 5,969,643 A * | 10/1999 | Curtis ................. 340/988 |
| 5,986,577 A * | 11/1999 | Bezos ................. 340/933 |
| 5,992,950 A | 11/1999 | Kumar et al. |
| 5,998,880 A | 12/1999 | Kumar |
| 6,012,011 A | 1/2000 | Johnson |
| 6,021,251 A | 2/2000 | Hammer et al. |
| 6,023,137 A | 2/2000 | Kumar et al. |
| 6,025,086 A | 2/2000 | Ching |
| 6,027,181 A | 2/2000 | Lewis et al. |
| 6,082,834 A | 7/2000 | Kolbe et al. |
| 6,104,148 A | 8/2000 | Kumar et al. |
| 6,175,272 B1 | 1/2001 | Takita |
| 6,208,097 B1 | 3/2001 | Reddy et al. |
| 6,211,646 B1 | 4/2001 | Kouzu et al. |
| 6,218,807 B1 | 4/2001 | Sakaue et al. |
| 6,274,998 B1 | 8/2001 | Kaneko et al. |
| 6,308,639 B1 | 10/2001 | Donnelly et al. |
| 6,331,365 B1 | 12/2001 | King |
| 6,359,346 B1 | 3/2002 | Kumar |
| 6,367,891 B1 | 4/2002 | Smith et al. |
| 6,371,573 B1 | 4/2002 | Goebels et al. |
| 6,384,489 B1 | 5/2002 | Bluemel et al. |
| 6,405,705 B1 | 6/2002 | Dunsworth et al. |
| 6,408,766 B1 | 6/2002 | McLaughlin et al. |
| 6,417,646 B1 | 7/2002 | Huykman et al. |
| 6,421,618 B1 | 7/2002 | Kliman et al. |
| 6,441,581 B1 | 8/2002 | King et al. |
| 6,449,536 B1 | 9/2002 | Brousseau et al. |
| 6,456,674 B1 | 9/2002 | Horst et al. |
| 6,456,908 B1 | 9/2002 | Kumar |
| D464,622 S | 10/2002 | Donnelly |
| 6,470,245 B1 | 10/2002 | Proulx |
| 6,486,568 B1 | 11/2002 | King et al. |
| 6,497,182 B2 | 12/2002 | Melpolder et al. |
| 6,507,506 B1 | 1/2003 | Piñas et al. |
| 6,532,405 B1 | 3/2003 | Kumar et al. |
| 6,537,694 B1 | 3/2003 | Sugiura et al. |
| 6,564,172 B1 | 5/2003 | Till |
| 6,581,464 B1 | 6/2003 | Anderson et al. |
| 6,591,758 B2 | 7/2003 | Kumar |
| 6,608,396 B2 | 8/2003 | Downer et al. |
| 6,611,116 B2 | 8/2003 | Bachman et al. |
| 6,612,245 B2 | 9/2003 | Kumar et al. |
| 6,612,246 B2 | 9/2003 | Kumar |
| 6,615,118 B2 | 9/2003 | Kumar |
| 6,618,662 B2 | 9/2003 | Schmitt et al. |

| | | | |
|---|---|---|---|
| 6,627,345 | B1 | 9/2003 | Zemlok et al. |
| 6,634,303 | B1 | 10/2003 | Madsen et al. |
| 6,653,002 | B1 | 11/2003 | Parise |
| 6,658,331 | B2 | 12/2003 | Horst et al. |
| 6,678,972 | B2 | 1/2004 | Naruse et al. |
| 6,688,481 | B1 | 2/2004 | Adner et al. |
| 6,691,005 | B2 | 2/2004 | Proulx |
| 6,697,716 | B2 | 2/2004 | Horst |
| 6,725,134 | B2 | 4/2004 | Dillen et al. |
| 6,728,606 | B2 | 4/2004 | Kumar |
| 6,737,822 | B2 | 5/2004 | King |
| 6,765,315 | B2 | 7/2004 | Hammerstrom et al. |
| 6,768,447 | B2 * | 7/2004 | Franckart .................. 701/214 |
| 6,812,656 | B2 | 11/2004 | Donnelly et al. |
| 6,823,835 | B2 | 11/2004 | Dunsworth et al. |
| 6,829,529 | B2 | 12/2004 | Trefzer et al. |
| 6,829,556 | B2 | 12/2004 | Kumar |
| 6,879,054 | B2 | 4/2005 | Gosselin |
| 6,885,920 | B2 | 4/2005 | Yakes et al. |
| 6,909,200 | B2 | 6/2005 | Bouchon |
| 6,909,201 | B2 | 6/2005 | Murty et al. |
| 6,909,959 | B2 | 6/2005 | Hallowell |
| 6,941,218 | B2 | 9/2005 | Wolf et al. |
| 6,973,880 | B2 | 12/2005 | Kumar |
| 7,102,313 | B2 | 9/2006 | Kadota et al. |
| 2002/0190525 | A1 | 12/2002 | Worden et al. |
| 2003/0150352 | A1 | 8/2003 | Kumar |
| 2003/0151387 | A1 | 8/2003 | Kumar |
| 2003/0233959 | A1 | 12/2003 | Kumar |
| 2004/0133315 | A1 | 7/2004 | Kumar et al. |
| 2005/0024001 | A1 | 2/2005 | Donnelly et al. |
| 2005/0045058 | A1 | 3/2005 | Donnelly et al. |
| 2005/0279243 | A1 | 12/2005 | Bendig et al. |
| 2006/0001399 | A1 | 1/2006 | Salasoo et al. |

FOREIGN PATENT DOCUMENTS

| | | |
|---|---|---|
| CA | 2411132 | 11/2002 |
| EP | 0 348 938 | 1/1990 |
| EP | 1 769 997 A2 * | 4/2007 |
| GB | 873167 | 3/1960 |
| GB | 1129709 | 11/1966 |
| GB | 1 312 699 | 10/1970 |
| GB | 2 005 205 A | 9/1977 |
| WO | WO 03/072388 | 9/2003 |
| WO | WO 2004/042890 | 5/2004 |
| WO | WO 2005/030550 | 4/2005 |
| WO | WO 2005/079504 | 9/2005 |
| WO | WO 2005/084335 | 9/2005 |
| WO | WO 2005/086910 | 9/2005 |

OTHER PUBLICATIONS

Perreault, David J. et al, "A New Design For Automotive Alternators", Massachusetts Institute of Technology, 12 pages.
Railway Age, "Switchers, the Gen-Set generation", Simmons-Boardman Publishing Corporation, vol. 207 No. 3, copyright 2006, 1 page.
International Preliminary Report on Patentability for counterpart PCT application, dated May 3, 2006.
"The Car and Locomotive Encyclopedia" by Kalmbach Publishing Company, 1980, 3 pages.
"Motor Control Electronics Handbook" edited by Richard Valentine, McGraw Hill 1998, ISBN 0-07-066810-8, 1998, 31 pages.
"Progress in Overcoming the Failure Modes Peculiar to VRLA Batteries", A. Cooper, P.T. Moseley, Journal of Power Sources 113 (2003) 200-208.
"Research Results from the Advanced Lead-Acid Battery Consortium Point the Way to Longer Life and Higher Specific Energy for Lead/Acid Electric-vehicle Batteries", P.T. Moseley, Journal of Power Sources 73 (1998) 122-126.
"Improving the Valve-Regulated Lead Acid Battery", P.T. Moseley, Journal of Power Sources 88 (2000) 71-77.
"Keeping Up the Pressure-Strategies to Maintain Plate-Group Pressure and Extend the Cycle Life of VRLA Batteries", M.J. Weighall, Journal of Power Sources 95 (2001) 209-217.
"VRLA Traction", First International Symposium on the Use of VRLA Batteries in Traction Application, Honolulu, Jun. 2005.
International Search Report dated Nov. 15, 2005 for PCT Application No. PCT/US05/10983.
International Written Opinion dated Nov. 15, 2005 for PCT Application No. PCT/US05/10983.
U.S. Appl. No. 11/060,087, filed Feb. 17, 2007, Donnelly.
U.S. Appl. No. 11/060,221, filed Feb. 17, 2004, Donnelly.
U.S. Appl. No. 11/060,223, filed Feb. 17, 2004, Donnelly et al.
U.S. Appl. No. 11/070,848, filed Mar. 1, 2005, Maier.
U.S. Appl. No. 11/075,550, filed Mar. 8, 2005, Donnelly.
U.S. Appl. No. 60/600,330, filed Aug. 9, 2004, Donnelly.
U.S. Appl. No. 60/607,194, filed Sep. 3, 2004, Donnelly.
U.S. Appl. No. 60/616,173, filed Oct. 4, 2004, Donnelly.
U.S. Appl. No. 60/618,631, filed Oct. 13, 2004, Donnelly.
U.S. Appl. No. 60/618,632, filed Oct. 13, 2004, Donnelly.
U.S. Appl. No. 60/674,837, filed Apr. 25, 2005, Donnelly.
Thompson, "Electric Transportation," International Textbook Co., Scranton, Pa; (1st Ed., 1940), pp. 254-262.
Mendler, "The Technological Opportunities of Hybrid Electric Vehicles," Society of Automotive Engineers, Inc. (1996), pp. 1-16.
Mercer, "Innovative Use of Horsepower—Hybrid Bus Powered by Gas Turbine," *Diesel Progress* (Dec. 1997), pp. 56-57.
Berg, "Concept Truck Addresses Future Clean Air Demands With Hybrid Turbine-Electric Powertrain," *Emissions Alternatives Fuels* (date unknown), pp. 55-57.
FMTV—with HybriDrive Propulsion System, pp. 1-3.
Nene, "Advanced Propulsion Systems for Urban Rail Vehicles: Chapter 2: DC Drives with a Chopper Controller," Prentice-Hall, Inc. (1985), pp. 18-45.
Kostic et al., "An Analytic Solution of the Choppers Ripple Currents," Proceedings of the 1993 IEEE/ASME Joint Railroad Conference, Apr. 1993, pp. 103-107.
Hassan Moghbelli et al., "Chopper Design for NICTD Locomotives," Proceedings of the 1993 IEEE/ASME Joint Railroad Conference, Apr. 1993, pp. 67-75.
C.E. Band et al., "Development of and Operational Experience with a High Powered D.C. Chopper for 1500 Volt D.C. Railway Equipment," Institution of Electrical Engineers Conference Publication 53 on Power Thyristors and Their Applications, Part 1 (May 1969), 1 pages.
M.J. Hapeman et al., "Diesel Electric Locomotive Propulsion Systems—A Look into the Future," IEEE Technical Papers Presented at the 1985 Joint ASME/IEEE Railroad Conference, New York City, NY, Apr. 16-18, 1985, pp. 108-115.
Joseph Szymborski et al., "Examination of VRLA Battery Cells Sampled from the Metlakatia Battery Energy Storage System", 15 pages.
"Locomotive Energy Storage System," Advanced Railway Technology, Inc. (Dec. 1985), 22 pages.
Declaration of Frank Donnelly Under 37 CFR§ 1.98, 5 pages.
Declaration of Ronald Bailey under 37 CFR§ 1.98 dated Dec. 3, 2004 for U.S. Appl. No. 10/650,011, 3 pages.
"Lead-Acid Battery State of Charge vs. Voltage", Richard Perez, Home Power #36, Aug./Sep. 1993, 5 pages.
"Thermal Evaluation of the Honda Insight Battery Pack" M.D. Zolot et. al. National Renewable Energy Laboratory, Presented at the 36th Intersociety Energy Conversion Engineering Conference, Savannah Georgia, Jul. 29 to Aug. 2, 2001, 9 pages.
"Development of a New Battery System for Hybrid Vehicle", Tomokazu Yamauchi et al, Toyota, presented at the EVS 17 in Montreal, Oct. 2000, 7 pages.
"Supercapacitive Energy Storage for Diesel-Electric Locomotives", Destraz, Barrade and Rufer, Swiss Federal Institute of Technology, paper presented at SPEEDAM 2004, Jun. 16, Capri, Italy, 6 pages.

Press Release: "French Railway Company Voies Ferees Legeres et Industielles (VFLI) Puts Its Trust in Deutch Engines", Jun. 2003, 2 pages.

"Comparative Economic Assessment of a Natural Gas Fueled Locomotive with On-Board CNG Storage to Diesel and LNG Variants", Donnelly et al, IEEE/ASME, Joint Railroad Conference, Baltimore, Apr. 1995, 30 pages.

"Linear/Switchmode Voltage Regulator Handbook" Motorola, Inc. 1982, 3 pages.

"The Control of Switched Reluctance Drives and their Use for Flywheel Energy Storage", Brabandere et al., 5 pages.

"Performance and Control of the Switched Reluctance Motor", Dahdah et al, University of Western Sydney, Australia, 4 pages.

Design of Switched Reluctance Motors and Development of a Universal Controller for Switched Reluctance and Permanent Magnet Brushless DC Motors, Phd Dissertation, Virginia Polytechnic Institute and State University, Prahveen Vijayraghavan, Blacksburg, VA, Nov. 2001, 215 pages.

"Li-Ion Battery-Powered Buck-Boost Regulator Minimizes Portable Product Size", Chen, IIC-China/ESC-China Conference Proceedings, 2002, 5 pages.

U.S. Appl. No. 11/143252, Donnelly.

* cited by examiner

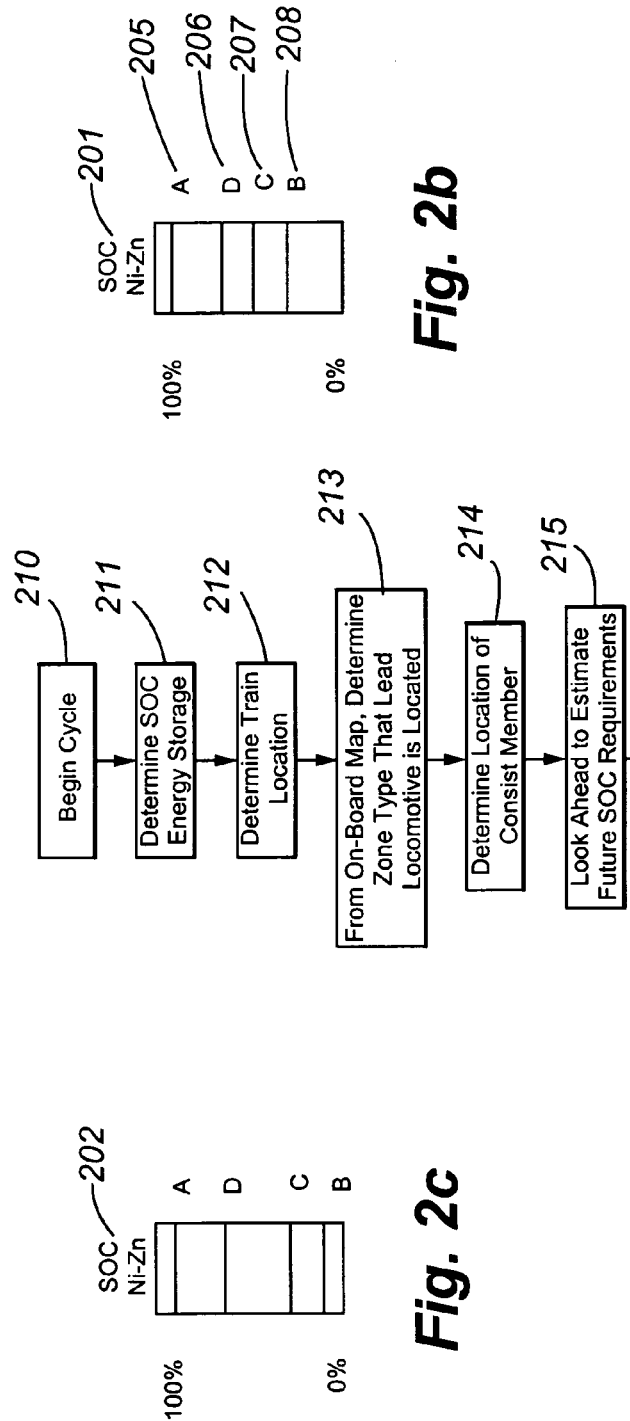
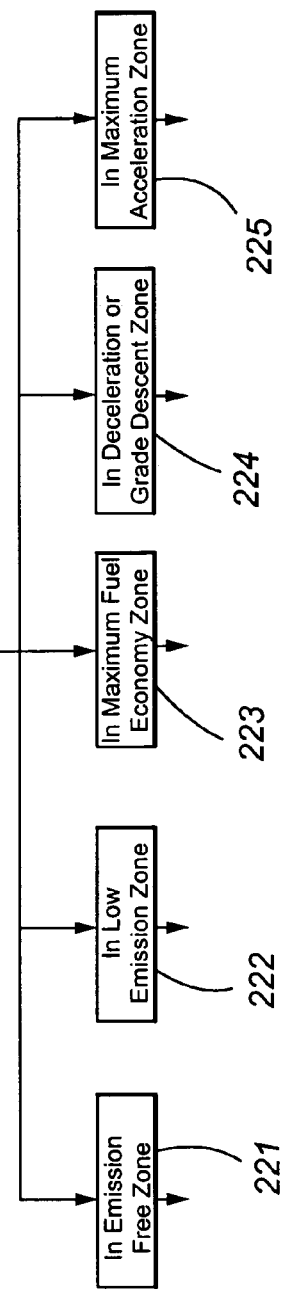
Fig. 2a
Fig. 2b
Fig. 2c

EMISSION MANAGEMENT FOR A HYBRID LOCOMOTIVE

CROSS REFERENCE TO RELATED APPLICATION

The present application claims the benefits, under 35 U.S.C. § 119(e), of U.S. Provisional Application Ser. No. 60/558,077, filed Mar. 30, 2004, of the same title to Watson, et al., which is incorporated herein by this reference.

FIELD

The present invention relates generally to locomotives and specifically to a hybrid locomotive which is suitable for operation under controlled environmental conditions.

BACKGROUND

Conventional stand-alone locomotives have output power typically ranging from approximately 300 horsepower (for example, locomotives used in mining and tunneling) to 6,000 horsepower (for example, locomotives for long haul cross-country freight trains). In many applications, a number of locomotives may be used in a consist for freight haulage or commuter trains for example.

Conventional railroad locomotives are typically powered by diesel-electric systems or by diesel-hydraulic systems. It is known that a hybrid locomotive or a hybrid locomotive/tender car combination can be used to capture and store energy that is otherwise wasted by incorporating an energy storage system (battery pack, capacitor bank, flywheel assemblies or combinations of these systems). The energy storage system may be charged by an on-board engine, by another hybrid or conventional locomotive in the consist, by a regenerative braking system or by an external source. The stored energy may be used to power the traction motors of the energy storage car or the traction motors of other operative members of the consist.

Donnelly has disclosed the use of a battery-dominant hybrid locomotive in U.S. Pat. No. 6,308,639 which is incorporated herein by reference. Donnelly et al. have disclosed a method of monitoring, synchronizing and optimizing the operation of the locomotive drive train in U.S. patent application Ser. No. 10/649,286 and have also disclosed a method of allocating energy amongst members of a consist in U.S. patent application Ser. No. 11/070,848, both of which are also incorporated herein by reference.

In many areas where rail use is widespread, especially large urban settings, there are special requirements for emissions and noise control which are becoming more and more stringent. Commuter and short haul freight routes typically involve many starts and stops and often involve significant idling time. Many of these routes also may pass over significant grades. While conventional diesel locomotives are achieving higher emissions standards and fuel economy, there are many situations such as partially enclosed or underground stations, tunnels or densely populated areas where low emissions and moderate noise operation or no emissions and low noise operation are required and these requirements cannot always be met by conventional diesel locomotives.

There remains a need for hybrid diesel-electric or diesel-hydraulic locomotives which are capable of operation, including high acceleration capability, at very low or zero emission and low noise levels such as would be required, for example, by commuter trains entering and exiting underground stations.

SUMMARY

These and other needs are addressed by the various embodiments and configurations of the present invention which are directed generally to a method for monitoring, controlling and/or optimizing the emission and profile for a hybrid locomotive or consist of hybrid locomotives.

In a first embodiment of the present invention, a method for operating a locomotive is disclosed that includes the steps of (a) receiving a locating signal indicating a current spatial location of a selected locomotive; (b) determining that the selected locomotive has entered, is entering, and/or is about to enter a spatial zone having at least one controlled parameter where the controlled parameter is one or more of a fuel combustion emissions level and a noise level; and (c) automatically configuring the operation of the selected locomotive to comply with the controlled parameter.

The locating signal can be any suitable mechanical, wireless or wired signal and is preferably emitted by a Global Positioning System, a radio, a cell phone, a transponder and/or a mechanical locator situated along the track.

The selected locomotive can be any rail vehicle. For example, the rail vehicle can be a locomotive having a number of prime movers, with the prime movers being selectively operated as needed to meet required energy needs while complying with one or more controlled parameters. For example, a first subset of prime movers is operated while a second subset of the prime movers is not operated. Commonly, the selected locomotive is a dual-mode hybrid vehicle having a large energy storage capability, a substantial power generating system and a regenerative braking system. The vehicle is automatically managed to turn its engines off when emissions-free operation is required; or to turn some engines off or to idle when low emissions operation is required; or to turn the engines on to boost locomotive acceleration as required, for example when leaving a station.

Typically, locomotives are subject to emissions levels of non-methane hydrocarbons (HC), carbon monoxide (CO), nitrous oxides (NOxs) and particulate material (PM). These are subject to minimum prescribed values by regulations in effect at any one time. These regulations may change from time to time, usually becoming more stringent. The levels of any of the above emissions are typically expressed as a mass of the emitted pollutant per unit power-time (e.g., grams per kilowatt-hour) where the power is the power delivered by the locomotive engine. In a hybrid, power is delivered by a combination of one or more engines and an energy storage unit and therefore a hybrid can operate at a given power level of which only a fraction is provided by the prime mover(s). As used herein, "emissions free" or "zero emissions" preferably refers to average levels of emitted pollutants that are at least less than about 10% of the minimum values set by the regulations in effect. It is more preferable that "emissions free" or "zero emissions" refer to the condition that all the prime movers are turned off. As further used herein, "low emissions" refers to average levels of emitted pollutants that are at least less than about 50% of the minimum values set by the regulations in effect.

Another pollutant is sulphur dioxide ($SO_2$) which is dependent on the specific fuel used. This pollutant is also subject to a minimum value by regulations in effect at any one time and is also typically expressed as a mass of the emitted pollutant per unit power-time where the power is the power delivered by the locomotive engine. As used herein, "emissions free" or "zero emissions" commonly refers to average levels of $SO_2$ that are at least less than about 10% of the minimum values set by the regulations in effect. It is most preferable that "emissions free" or "zero emissions" refer the condition that all the prime movers are turned off. As further used herein, "low emissions" commonly refers to average levels of $SO_2$ that are at least less than about 50% of the minimum values set by the regulations in effect.

Noise levels are typically measured 30 meters perpendicular to the locomotive and are expressed in dBa over a given range of audible frequencies, typically from 250 to 1,000 Hertz. Power plant noise levels may be prescribed for stationary locomotives in an idling or throttled up mode and also in various passer-by or moving modes. As used herein, moderate noise level commonly refers to average noise at least about 3 dBa less than the regulations in effect for a conventional locomotive of equivalent total power and low noise level commonly refers to average noise at least about 6 dBa less than the regulations in effect for a conventional locomotive of equivalent total power. The averages of emissions and noise are determined over the time period in which the corresponding operational mode is employed by the hybrid locomotive.

The hybrid locomotive is commonly comprised of at least a prime mover, an energy conversion device to convert the energy output by the prime mover into a form suitable for storage or propulsion, an energy storage unit, a supply of fuel for the prime energy source and appropriate controls, all mounted on a frame which includes two or more truck assemblies, each truck assembly being further comprised of AC or DC traction motors each of which may be controlled by its own inverters and/or chopper circuits. The hybrid locomotive is additionally provided with a dynamic braking system that includes a regeneration system for transferring some or all of the energy recovered from braking to the energy storage system.

As can be appreciated, regulations for engine emissions and engine noise can vary from country to country and, within countries, from state to state or province to province. In addition, regulations change over time as new technology is developed and mandated. The following tables illustrate some emissions and noise regulations currently in effect in the United States for conventional (non-hybrid locomotives). The emissions regulations in California are somewhat more stringent.

Tier 2 Emissions Standard for US Locomotives (2005 and Later)

| Duty Cycle | HC, g/bhp-hr | CO, g/bhp-hr | NOx, g/bhp-hr | PM, g/bhp-hr |
|---|---|---|---|---|
| Line-Haul | 0.3 | 1.5 | 5.5 | 0.20 |
| Switcher | 0.6 | 2.4 | 8.1 | 0.24 |

30 Meter Test, Noise Standard, Locomotives Manufactured After Dec. 31, 1979

| Noise Source | Weighted Sound Level in dB |
|---|---|
| Stationary, Idle | 70 |
| Stationary, all other throttle settings | 87 |
| Moving | 90 |

In another embodiment of the present invention, a hybrid locomotive operates in a plurality of operating modes which include one or more of:
  zero emissions;
  specified low emissions;
  maximum fuel economy;
  maximum energy recovery (optionally including with engines off);
  maximum power for acceleration;
  low noise levels;
  moderate noise levels;

In a preferred configuration, a single hybrid locomotive is configured to operate in a variety of operational and/or environmental states by automatically or manually switching between control algorithms. The control algorithms can be software executed by a central processor and/or a logic circuit that is selectively activated when the corresponding control algorithm is invoked.

Under a first control algorithm, the hybrid locomotive can operate in its zero emissions mode by shutting off(or continuously deactivating) its prime mover(s) and operating primarily from its energy storage unit. In other words, when the first control algorithm is invoked at least most of the energy to operate the traction motor(s) is removed from the energy storage unit.

Under a second control algorithm, the hybrid locomotive can operate at a specified low emissions mode by operating its prime mover at a specified emissions level (including idling) and supplementing any required additional power from its energy storage unit. Under this algorithm, the prime mover is one or more of (a) activated and deactivated intermittently, (b) intermittently activated but not transmitting power (e.g., idling); and (c) activating and transmitting power to provide energy to the energy storage unit. As in the first operational mode, at least most of the energy to operate the traction motor(s) is removed from the energy storage unit.

Under a third control algorithm, the hybrid locomotive prime mover operates freely. In this mode, the prime mover provides at least most of the energy required to operate the traction motor(s). This typically means that energy is not removed and/or intermittently removed from the energy storage unit. Preferably, the prime mover is operated at maximum fuel economy by operating at or near their optimum fuel-conservative operating regime; supplementing any required additional power from its energy storage unit; or returning any excess power to its energy storage unit. With many diesel engines, the optimum fuel-conservative operating point may not be the minimum emissions operating point. Most engines can be characterized by a fuel map which plots output power (kW) versus engine rpms with contours of constant specific fuel consumption (kg/kW-hr). Additionally, engine maps may also show contours of constant specific emission levels for each type of pollutant. Such maps, stored in an on-board computer, would allow an algorithm to shift engine operation to slightly better fuel efficiency or lower emissions at a given rpm or power, when required.

Under a fourth control algorithm, the hybrid locomotive can operate in maximum acceleration mode where propulsive power to the traction motors is provided by both its prime mover(s) and energy storage system operating together at or near their respective maximum power ratings.

Under a fifth control algorithm, the hybrid locomotive operates in braking mode and maximizes its energy recovery from its regenerative braking system so that it can more readily operate in its other controlled emissions modes. In this mode, the locomotive may also be operated by shutting off its prime mover(s), providing at least some of the energy generated by regenerative braking to the energy storage unit, and operating all required auxiliary power solely from its energy storage unit.

Other embodiments involve operating a consist of locomotives, at least one of which is a hybrid locomotive. An important feature of these embodiments of the invention is that the entire consist must have the ability to operate in emissions free mode over a significant portion of its route, such as for example a long tunnel or an underground station where the train must stop, for a reasonable period of time and in low emissions mode over another substantial portion of its route, such as for example entering an open-air station or traveling through an area under strict emissions controls.

In a first consist embodiment, at least two of a hybrid locomotive and energy tender car form a locomotive consist where the operation of each hybrid locomotive and energy tender car has the autonomous ability to operate in one or more of the operational and environmental states described above. This embodiment might be preferred, for example, if all members of the consist have the same configurations of hybrid locomotives and energy storage tender cars. In this embodiment, all of the members of the consist must have a regenerative braking system.

In a second consist embodiment, at least two of a hybrid locomotive and energy tender car form a locomotive consist where the operations of a number of the members of the consist are co-ordinated to maximize the effectiveness of the operational and environmental states described above, by a master controller in communication with all the members of the consist. This embodiment might be preferred, for example, if various members of the consist have differing configurations of hybrid locomotives and energy storage tender cars. In this embodiment, all of the members of the consist commonly have a regenerative braking system.

In a third consist embodiment, at least two of a hybrid locomotive and energy tender car form a locomotive consist where the operations of a number of the members of the consist are co-ordinated to maximize the effectiveness of the operational and environmental states described above, by a master controller in communication with all the members of the consist and with the ability to allocate energy between the various members of the consist. The method of allocating energy amongst members of a consist was previously disclosed in U.S. patent application Ser. No. 11/070,848, filed Mar. 1, 2005, which is incorporated herein by reference. This latter feature means that consist members are interconnected by a direct DC current power bus for exchanging electrical energy. This embodiment is most preferred for many configurations of hybrid locomotives and energy storage tender cars since imbalances in energy storage between members can be corrected. In this embodiment, at least one of the members of the consist has a regenerative braking system. Not all of the members of the consist need have a regenerative braking system since energy can be transmitted to or received from other consist members.

In a fourth consist embodiment, a method is provided for managing the environmental states of a consist of locomotives where at least one of the members of the consist is a hybrid locomotive, at least one of the consist members is not a hybrid, and the consist is operated at low emissions or zero emissions mode over a substantial portion of its route. In this embodiment, the non-hybrid members of the consist may be required to idle (low emissions mode) over a substantial portion of the route and to be turned off (zero emissions mode) over another substantial portion of the route. The consist is managed by a master controller in the lead hybrid locomotive and is in communication with all the members of the consist. This embodiment is applicable for consists which may contain non-hybrid members such as conventional diesel-electric or diesel-hydraulic locomotives. If consist members are interconnected by a direct current power bus for exchanging electrical energy, then the master controller may have the ability to allocate energy between the various members of the consist. This would include being able to transfer energy to or from the traction motors of the non-hybrid members of the consist.

In another embodiment, at least two of a hybrid locomotive and energy tender form a part of a locomotive consist having one or more independently controllable features. These independently controllable features may include, for example, the total amount of tractive effort applied, the operation of the prime power sources, the amount of stored energy used, the amount of power applied by either or both of the prime power sources and energy storage systems, control of wheel slip, control of wheel skid, amount of regenerative braking energy stored and amount of energy, if any, transferred to other locomotives in the consist. Independent control of features such as described above can be effected by predetermined or programmable logic in an on-board programmable logic controller, a microcomputer, an industrial computer or the like. Control may also be accomplished for each member in the consist from the lead hybrid locomotive, or from the lead hybrid locomotive to the adjacent hybrid locomotive and then daisy-chained from each neighboring member of the consist to the next utilizing predetermined or programmable logic in on-board programmable logic controllers, microcomputers, industrial computers or the like. Control may be by any number of communication methods such as for example, by hard wire from locomotive to locomotive, radio telemetry, other forms of wireless communication, and/or audio and/or video linkage telemetry.

As can be appreciated, members of the consist need not be adjacent to one another and can be located anywhere in the train. It is therefore possible, with a long train and with consist members at various positions within the train, that different consist members may be in different operating zones. For example, the lead hybrid locomotive may be in an emissions free zone (such as for example a tunnel) while the hybrid consist member at the end of the train may be in a low-emissions zone or ascending a grade where it can be operating in maximum power mode.

The above-described embodiments and configurations are neither complete nor exhaustive. As will be appreciated, other embodiments of the invention are possible utilizing, alone or in combination, one or more of the features set forth above or described in detail below.

As used herein, "at least one . . . and", "at least one . . . or", "one or more of . . . and", "one or more of . . . or", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, and A, B and C together.

BRIEF DESCRIPTION OF THE DRAWINGS

FIG. 2a is an example of a main flow chart of automated decision making for controlling various hybrid locomotive operating modes.

FIG. 2b shows a simple state-of charge diagram typical of a lead-acid battery system.

FIG. 2c shows a simple state-of charge diagram typical of a nickel-zinc battery system.

DETAILED DESCRIPTION

This invention is preferably directed to dual-mode hybrid locomotives whose power for acceleration may be provided by both an energy storage unit such as for example a large battery pack and a power generating system such as for example one or more diesel engines. The energy storage unit is capable of providing propulsive and auxiliary power without generating emissions by operating for substantial periods with the prime mover(s) idling or turned completely off. The prime mover(s) are used at different times to provide all the required power; some of the power by augmenting the power supplied by the energy storage system; none of the power when idling or shut off. The prime mover(s) when providing power may provide some or all of the power for propulsion, charging the energy storage system and an auxiliary power system.

Figure 1:
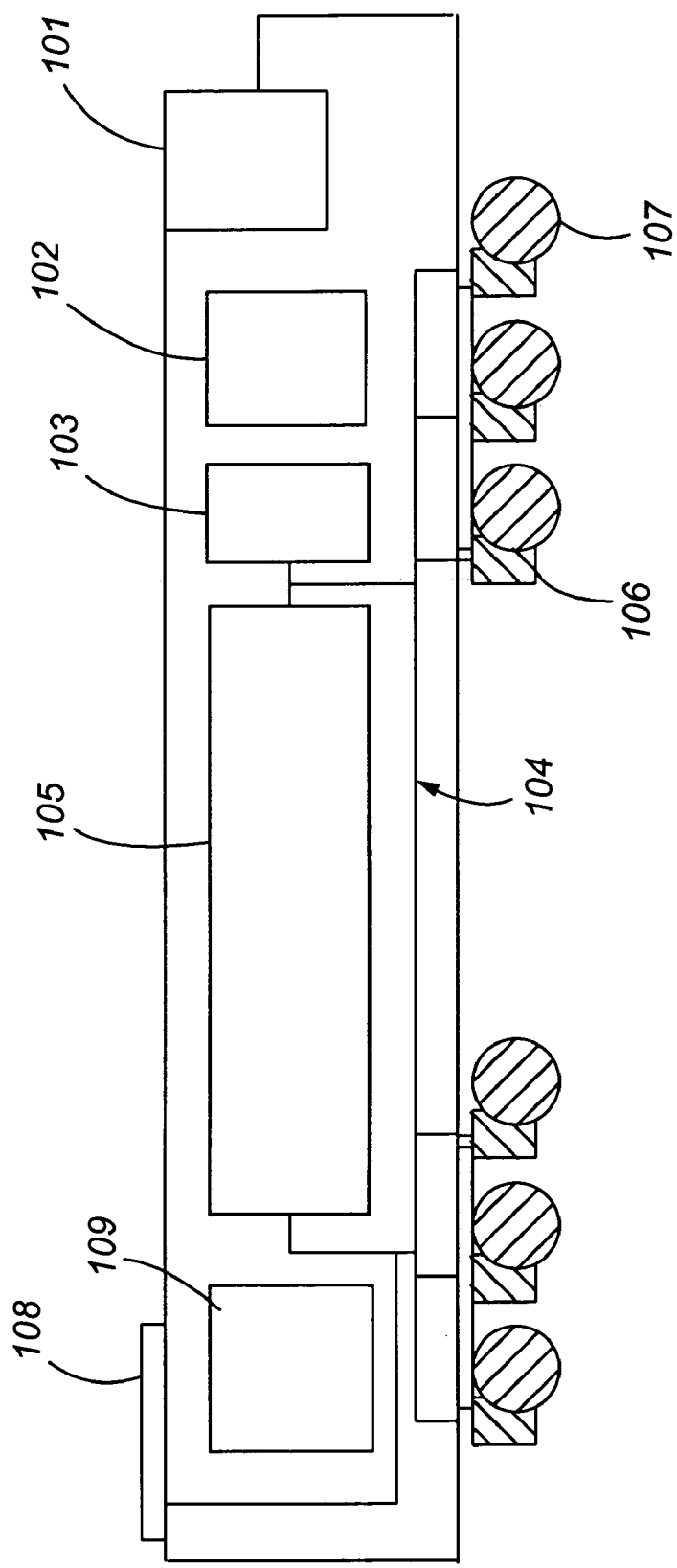
FIG. 1 is a schematic side view of a typical hybrid locomotive of the present invention.

FIG. 1 is a schematic side view of a hybrid locomotive of the present invention illustrating the functional relationships of the principal components a hybrid locomotive with regenerative braking. The hybrid locomotive has a control cab 101. The prime power is provided by one or more prime movers 102. The engines 102 are used to drive a power conversion unit 103 which provides DC electrical power to a DC bus 104. An energy storage unit 105 is also connected to the DC bus. Power from the DC bus 104 can flow to or from the energy storage unit 105 or to a plurality of traction motors 106. Typically, the traction motors 106 each drive an axle and wheel pair 107. As can be appreciated, the DC bus 104 can provide power to the traction motors 106 simultaneously from both the prime movers and the energy storage unit. When blocking diodes are used in the power conversion unit 103, power cannot flow back to the engines 102. The DC bus 104 may also transmit electrical power to an auxiliary power supply (not shown) such as might be used to operate the locomotive's lighting and air-brake system for example. If the traction motors 106 are AC motors, they receive AC power by means of inverters (not shown) connected to the DC bus 104. Alternately, if the traction motors 106 are DC motors, they receive DC by means of chopper circuits (not shown) connected to the DC bus 104. When in braking mode, the traction motors 106, now acting as a generators, return power to the DC bus 104. The regenerative braking is typically accomplished by externally exciting the traction motors 106 that power the drive axles and converting them to electrical generators during a braking phase. Again, because of blocking diodes in the power conversion unit 103, power from regenerative braking cannot flow back to the engines 102. Power can flow back to the energy storage unit 105. When a controller determines that the state-of-charge of the energy storage unit 105 reaches a predetermined upper limit, the excess energy from dynamic braking is transferred, by opening switch (not shown), to resistance grids 108 to be dissipated.

The engines are large enough to provide a significant portion of the instantaneous output power of the locomotive and therefore require a fuel tank 109. The fuel tank 109 can be located inside the locomotive or carried underneath as a belly tank or can be both. The capacity of the fuel tank is preferably in the range of 500 to 6,000 gallons. The aggregate power rating of the engines is preferably in the range of 100 to 2,500 kW. The storage capacity of the energy storage unit is preferably in the range of 500 to 2,500 kW-hrs.

The prime power is provided by one or more prime movers and can be any suitable power source such as for example one or more diesel engines, gas turbine engines, microturbines, Stirling engines, spark ignition engines or fuel cells. The power conversion unit may be an alternator/rectifier, for example. In the case of a prime mover such as a bank of fuel cells, the power conversion unit may be a simple chopper or a more versatile DC to DC buck/boost circuit. The energy storage system may be, for example, a battery pack, a bank of capacitors, a compressed air storage system with an air motor or turbine, or a flywheel of which a homopolar generator is an example, or a combination of these. The traction motors may be, for example, AC induction motors, DC motors, permanent magnet motors or switched reluctance motors. If the motor is an AC motor, it receives AC power by means of an inverter connected to the DC bus. Alternately, if the motor is a DC motor, it receives DC power using for example a chopper circuit connected to the DC bus.

In one configuration, the present invention incorporates a prime mover comprised of high efficiency internal combustion engines such as for example a diesel engine with modern emission controls. These devices permit simultaneous reduction of NOx and particulates, for example, and therefore solve many of the emissions problems associated with combustion engines. When in operation, the engines may be operated with maximum fuel efficiency and/or minimum emissions per unit of fuel consumed. When turned on the engine(s) may assist in propulsion and provide auxiliary power and/or charge the energy storage system, depending on the controller algorithm. Otherwise the engine(s) can be turned off and the hybrid locomotive can be operated in emissions-free mode. An important objective of the present invention is to minimize and control fuel usage with the engines. Since some irrecoverable energy is required to charge an energy storage system, it is usually always preferable to use engine power directly for propulsion and auxiliary power when possible. Only when engine energy is being wasted is it preferable to transfer it to an energy storage unit. Otherwise, it is usually preferable to operate the engine(s) in maximum fuel efficiency and/or minimum emissions per unit of fuel mode.

The propulsion system for the present invention may be that used in hybrid diesel-electric or hybrid diesel-hydraulic locomotives. In the latter cases, one traction motor may be used to provide shaft power to a gearbox and drive shaft system as disclosed in U.S. application Ser. No. 11/075,550, filed Mar. 8, 2005, by the present inventor and incorporated herein by reference. The hybrid locomotive of the present invention has a regenerative braking system that allows substantial energy to be returned to the energy storage unit during braking. This recovered energy can often provide a major source of recharging energy while operating in a reduced emissions mode or an emissions-free mode.

Because a commuter or short haul freight route involves considerable acceleration, braking and stopping, as well as periods where emissions-free operation may be required, power requirements may be highly variable. In addition, auxiliary power such as, for example, required by air-conditioning for a commuter train, can be a substantial fraction of the overall power requirement. Although average power required over the entire route may be relatively modest, peak power excursions during acceleration out of a station; operating at high speed; or ascending a grade, can be substantially higher than the average power over the route. Therefore, a locomotive with engine(s) that can be idled or turned off for long periods coupled with a substantial energy storage capability is preferred and is ideal for enabling an emissions management and control strategy.

In a preferred embodiment, the hybrid locomotive is provided with a device for determining its location at all times and at all locations along its intended route. For the example of a commuter locomotive, the capability can be provided by, for example, a Global Positioning System ("GPS") device, a radio, a cell phone or by a transponder or mechanical locator situated along the track. The locator device allows an on-board computer, which contains a detailed map of the commuter route and route emissions requirements, to determine when the locomotive is in a zone where any of a number of emissions and noise restrictions must be observed or where certain locomotive performance is required. An example of the latter may be a requirement for high acceleration such as, for example, exiting an underground station.

The on-board computer automatically manages the operation of the engines (one or more engines on or idling, or all engines off) and the state-of-charge ("SOC") of the energy storage system. It does so by projecting the energy and power requirements of the vehicle for each section or zone of the vehicle's route. The emissions management system ensures that the energy storage system is maintained within its preferred SOC range as much as possible while retaining enough capacity to provide the locomotive power requirements, including auxiliary power which can be substantial. The management system also ensures that the energy storage system is maintained within its preferred SOC range as much as possible while retaining enough capacity to absorb considerable recoverable energy from a regenerative braking system. Within these and other constraints, the management system further ensures that all emissions and noise restrictions, as well as any regulatory restrictions, along the route are met. As can be appreciated, the prime mover(s) are the principal source of emissions and noise. When operating in emissions free or low emissions mode, the noise levels of the locomotive are therefore also reduced. However, it may be required to turn off or idle one of more prime movers solely to comply with a noise requirement.

In another aspect of the present invention, an important objective is to manage the operation of the engines to comply with various environmental and regulatory restrictions while maximizing engine fuel efficiency, engine and energy storage apparatus lifetimes and minimizing operating costs. As will be shown, this management process is complex and not always suited to manual control, especially with a hybrid system. It is the objective of the present invention to disclose an automated hybrid locomotive engine, energy storage and environmental parameter management process that takes advantage of automated knowledge of the train's location at all times along a predetermined route using an on-board route map in conjunction with a locator which determines the locomotive's location and zone.

In yet another aspect of the present invention, an on-board computer control system may also have the ability to generate detailed route profiles and store these profiles in an on-board computer data bank of prior route profiles which quantify these past routes by a set of descriptors. These descriptors may include data on, for example, energy storage SOC, engine usage, locomotive speed, locomotive acceleration, locomotive deceleration, outside or ambient temperature, ambient precipitation, ambient wind speed and direction, rail condition (dry, slippery or even an estimate of adhesion coefficient), train length, train weight (e.g., passenger load), maximum power available from the energy storage unit, maximum power available from the prime mover, specific fuel consumption of the prime mover, total power usage (including auxiliary power usage), percent rail grade, track curvature, and the like. This data can be tagged with route location and time at closely spaced intervals such as for example, every second or every 5 meters. As part of the automated decision making process for controlling engine in a zone or subzone, the computer program can query the database of prior route profiles and compare previous operational zone profiles with the profile being computed for the current zone. This process can be used to adjust, if necessary, the profile for the current zone. The comparison can be made, for example, by progressively narrowing the prior profiles on the basis of descriptors associated with the profiles. For example, prior profiles where the temperature, wind and rail conditions are similar would be given a higher weighting than those with significantly different weather or rail conditions. Additionally, prior profiles could be adjusted for number of commuter cars in the train consist and even for passenger load. To implement this process, it is part of the present invention that the hybrid locomotive is provided with a device for determining outside weather, in addition to its location, at all times and at all locations along its intended route. This capability can be provided by, for example, existing on-line weather services through, for example, a radio, a cell phone or other wireless communications device that is connected to the on-board computer. Additional optional information may also be provided to the on-board computer on passenger load which affects train weight and hence energy generation and emissions control. The number of commuter cars in the train consist can be input by the train engineer or it can be determined automatically by the on-board computer from detailed data on power and acceleration coupled with a data base of commuter car and locomotive weights.

The energy storage tender car described in U.S. Pat. No. 6,615,118 provides additional power for the primary locomotive by storing excess energy from a conventional diesel locomotive or energy captured from a regenerative braking system. The tender car described in U.S. Pat. No. 6,615,118 cannot however, operate with the main locomotive's diesel engine shut off and therefore cannot operate in an emissions-free mode. The invention described in U.S. Pat. No. 6,615,118 embodies an energy management system. By contrast, the present invention embodies an emissions management system for a hybrid locomotive or consist of hybrid locomotives. A rail route may have sections where no emissions are allowed such as, for example, tunnels and underground stations. The route may have other sections where only low emissions are allowed such as, for example, sections entering and exiting open-air passenger stations. A fundamental condition of operations where emissions must be managed is that the locomotive or locomotive consist must be able to operate in zero emissions mode over a substantial portion of its route and in low-emissions mode over another substantial portion of its route. The same principles apply for operation when low or moderate noise levels are required.

FIG. 2a is an example of a main flow chart of automated decision making for controlling various hybrid locomotive operating modes for controlling power generation, energy storage and emissions over a typical rail route. As can be appreciated, similar flow charts can be applied to noise. This cycle of decisions can be executed continuously (for example every 1 second) or intermittently (for example every minute) or at intervals in between by a predetermined computer program or by a computer program that adapts, such as for example, a program based on neural network principles. There are four predetermined SOC levels that are used in this example, although additional levels may be defined. The predetermined levels are percentages of full charge. Examples of typical predetermined levels for A, B, C and D are shown in the following table for two types of energy storage battery chemistries, lead acid (FIG. 2b) ad nickel-zinc (FIG. 2c). These predetermined levels may change with improvements in battery technology and with charging algorithms used. They may also be quite different for other battery chemistries or other energy storage technologies.

| Typical Predetermined SOC Levels | | Nickel-Zinc | Lead-Acid |
|---|---|---|---|
| A | Maximum Normal Charge | 95% | 90% |
| B | Minimum Allowable Charge | 15% | 30% |
| C | Minimum Operating Charge | 10% | 20% |
| D | Preferred Operating Charge | 70% | 70% |

In the following examples, full charge is 100% and total discharge is 0%. In the above table and as shown in FIG. 2b, predetermined level A % 205 represents the highest SOC without causing excessive gas generation in the cell. Predetermined level B % 208 represents the lowest SOC before cell capacity begins to rapidly decline and further use of the energy storage system is damaging to the cells. Predetermined level C % 207 represents the lowest SOC before cell lifetime is adversely affected and represents the SOC above which the energy storage unit is preferably operated. Predetermined level D % 206 represents a preferred SOC that has some headroom for recovering energy from regenerative braking and enough capacity for sustained operation in emissions free mode, low emissions mode and maximum acceleration mode.

As shown in FIG. 2a, an automated cycle begins 210, the first step 211 in the decision cycle is to determine the SOC of the energy storage system, which may be determined by any number of well known methods such as, for example, by measuring voltage or by integrating current inputs and outputs. The next step 212 in the decision cycle is to determine the train's location along its route at the time in question. This capability can be provided by, for example, a Global Positioning System ("GPS") device or other means as described previously. The next step 213 in the decision cycle is to determine the zone that the train is located in along its route. This can be done, for example, by using the train's determined location and an on-board computer containing a detailed physical (2D or 3D as required) map of the commuter route and route requirements, to determine zone where any of a number of emissions and noise restrictions must be observed and where certain vehicle performance is required. An example of the latter may be high acceleration such as, for example, exiting an underground station. The next step 214 is to determine the location of the consist member in the train, typically from the train location device in the lead hybrid locomotive and from the knowledge of the number of cars that the consist member is removed from the lead locomotive. If there is only one locomotive, this step is trivial. In a long train where consist members may be at various locations, this step may be important since consist members can be located in different operating zones. The final step 215 is to look ahead as described previously to project energy and power requirements of the locomotive or consist for each section or zone of the train's up and coming route. Once the above information is determined, one of five operating modes is selected for the locomotive or other consist member. These are a zero emissions mode 221, a specified low emissions mode 222, a maximum fuel economy mode 223, a maximum energy recovery mode 224 and a maximum power or acceleration mode 225.

Figure 3:
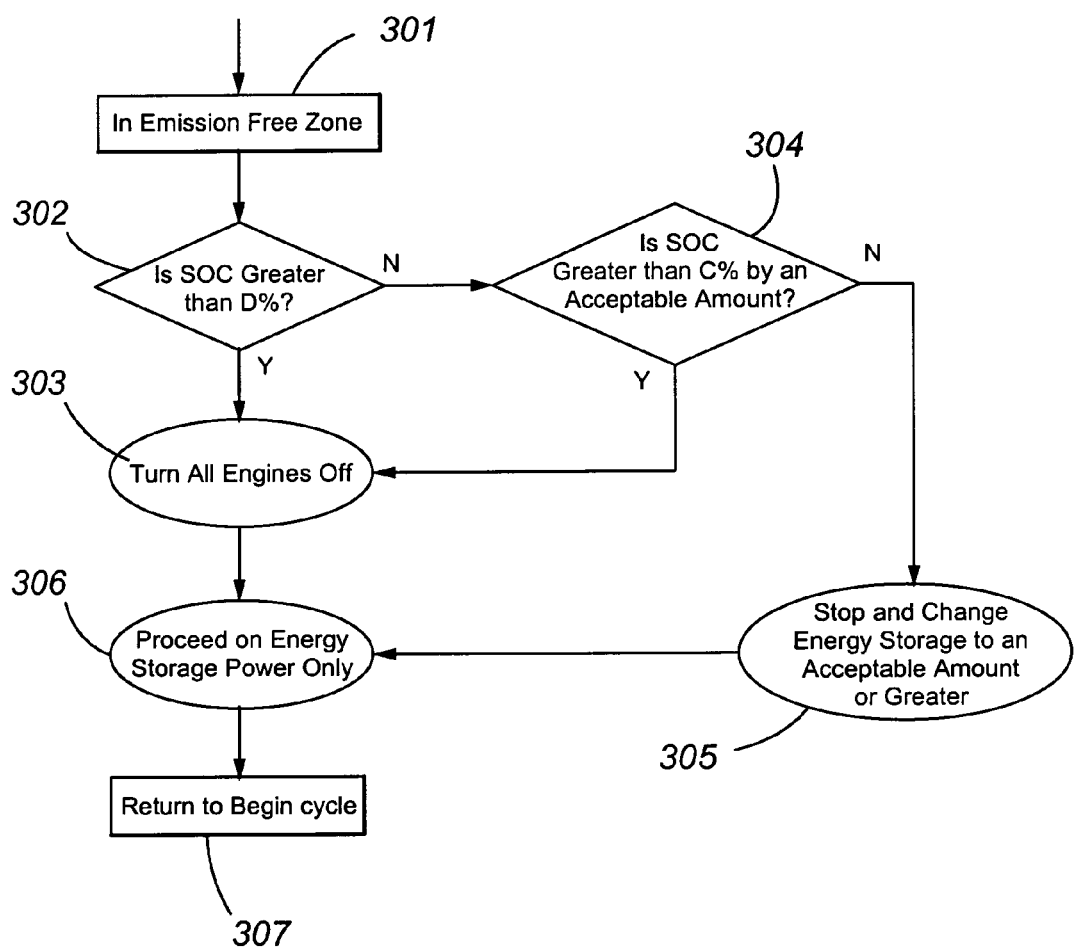
FIG. 3 is an example of an emissions free operating mode flow chart.

FIG. 3 is an example of decision making for a hybrid locomotive operating in an emissions free zone 301 and refers to FIG. 2b or 2c for SOC references. If the SOC of the energy storage system is greater than D % 302, then the engine(s) are turned off 303 and the train power is provided by energy storage unit only. If the SOC of the energy storage system is less than D % but greater than C % by an acceptable margin 304, then the engine(s) are turned off 303 and the train power is provided by energy storage unit only. An acceptable amount is determined by the look-ahead step and is a SOC that is sufficient to meet projected energy storage requirements. If the SOC of the energy storage system is less than an acceptable amount above C %, then the train must be stopped 305 and the engines turned on to charge the energy storage unit back to a level greater than C % by the acceptable or preferably to D % or greater. Once the train can proceed, the algorithm returns to the beginning of the cycle 306. It is appreciated that the train must be stopped if the SOC is less than an acceptable amount above C % because emissions free operation is only possible using the energy storage system with the engine(s) turned off.

Figure 4:
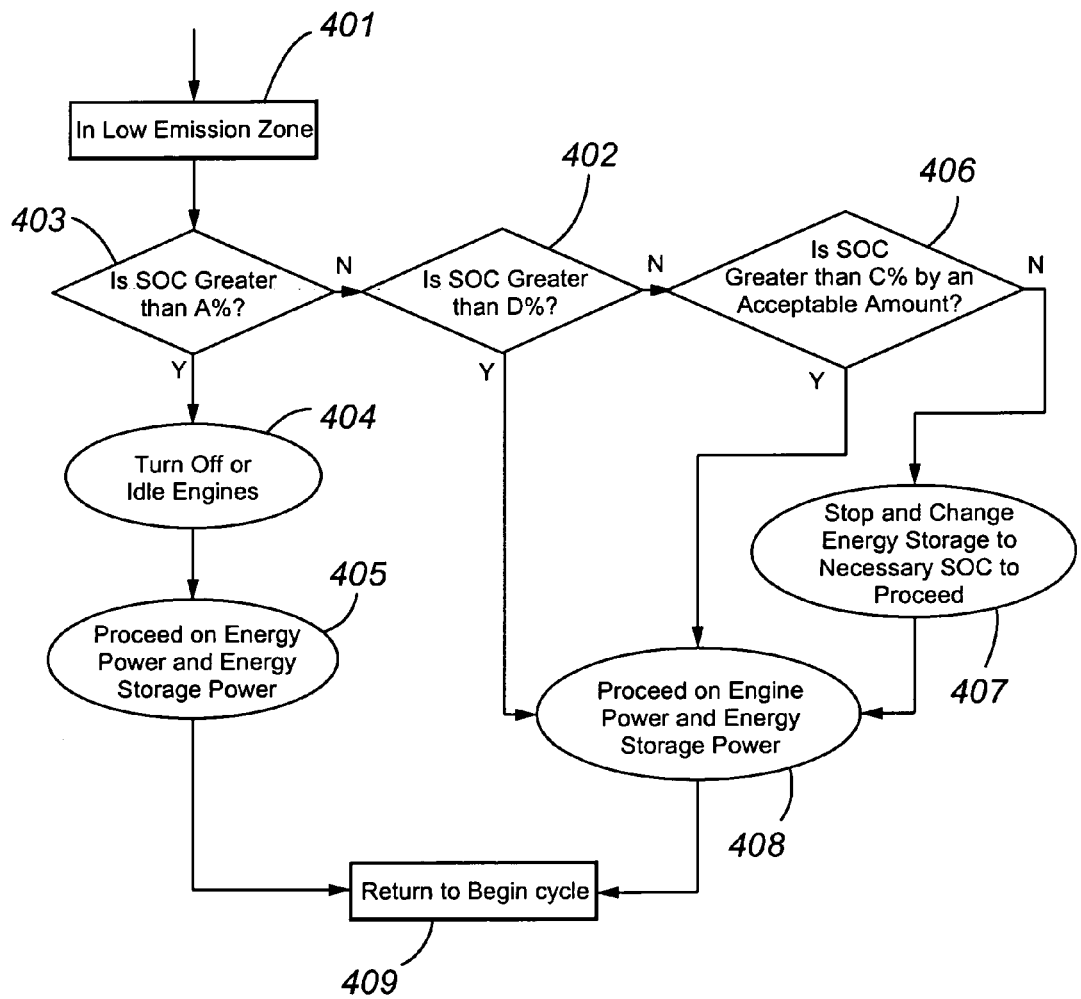
FIG. 4 is an example of a low emissions operating mode flow chart.

FIG. 4 is an example of decision making for a hybrid locomotive operating in an low or restricted emissions zone 401 and refers to FIG. 2b or 2c for SOC references. If the SOC of the energy storage system is greater than A % 403, then the engine(s) can be idled or turned off 404 and the train power is provided by energy storage unit only 405. This operation in zero emissions mode can be continued until the SOC is reduced somewhat below A %. If the SOC of the energy storage system is greater than D % 402, then train power is provided by some of the engines or, by the engines operated intermittently and by the energy storage unit 408. If the SOC of the energy storage system is less than D % but greater than C % by an acceptable margin 406, then train power is provided by some of the engines or, by the engines operated intermittently and by the energy storage unit 408. If the SOC of the energy storage system is less than an acceptable amount above C %, then the train must be stopped and the engines turned on to charge the energy storage unit 407 back to a level greater than C % by the acceptable amount. In low-emissions mode, the acceptable amount is typically less than the acceptable amount in zero emissions mode because some engine power can be used. Once the train can proceed, the algorithm returns to the beginning of the cycle 409.

Figure 5:
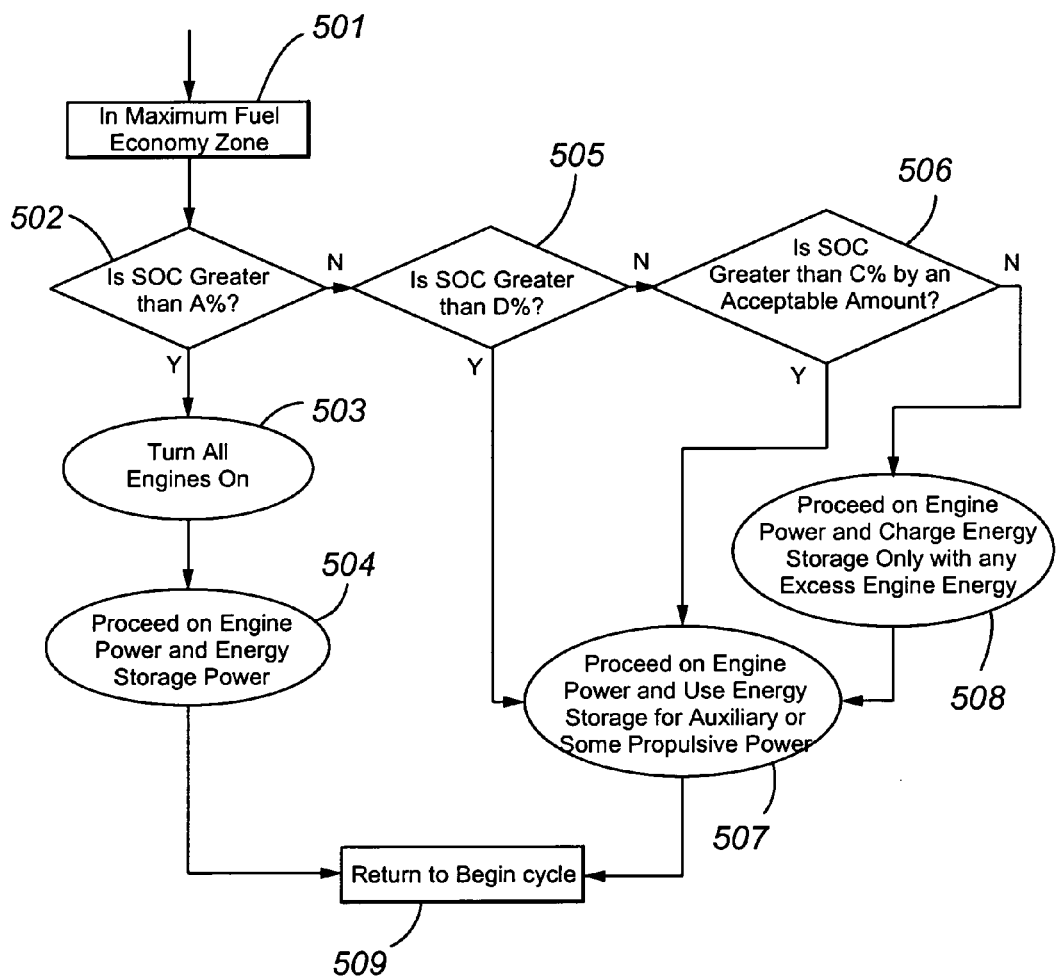
FIG. 5 is an example of a maximum fuel economy operating mode flow chart.

FIG. 5 is an example of decision making for a hybrid locomotive operating in maximum fuel economy operating mode 501 and refers to FIG. 2b or 2c for SOC references. This mode is typically used whenever there are no emissions restrictions and there is a desire for a balance of high performance and low fuel consumption. If the SOC of the energy storage system is greater than A % 502, then the engine(s) are turned on 503 and the train power is provided by both engine(s) and the energy storage unit 504. This operation can be continued until the SOC is reduced somewhat below A %. If the SOC of the energy storage system is greater than D % 505, then train power is provided by the engines and the energy storage system may be used to provide additional propulsive power and/or auxiliary power 507 if additional SOC headroom is required, for example to make room for anticipated regenerative energy. If the SOC of the energy storage system is less than D % but greater than C % by an acceptable margin 506, then train power is provided by the engines and the energy storage system may be used to provide additional propulsive power and/or auxiliary power 507 if additional SOC headroom is required. If the SOC of the energy storage system is less than an acceptable amount above C % 506, then the train can proceed on engine power and excess engine power may be used to charge the energy storage system 508. If the SOC of the energy storage system is less than anticipated future requirements, such as for example, an upcoming zero or low emissions zone, then the engines may be required to provide additional energy for charging. Once the train can proceed, the algorithm returns to the beginning of the cycle 509.

Figure 6:
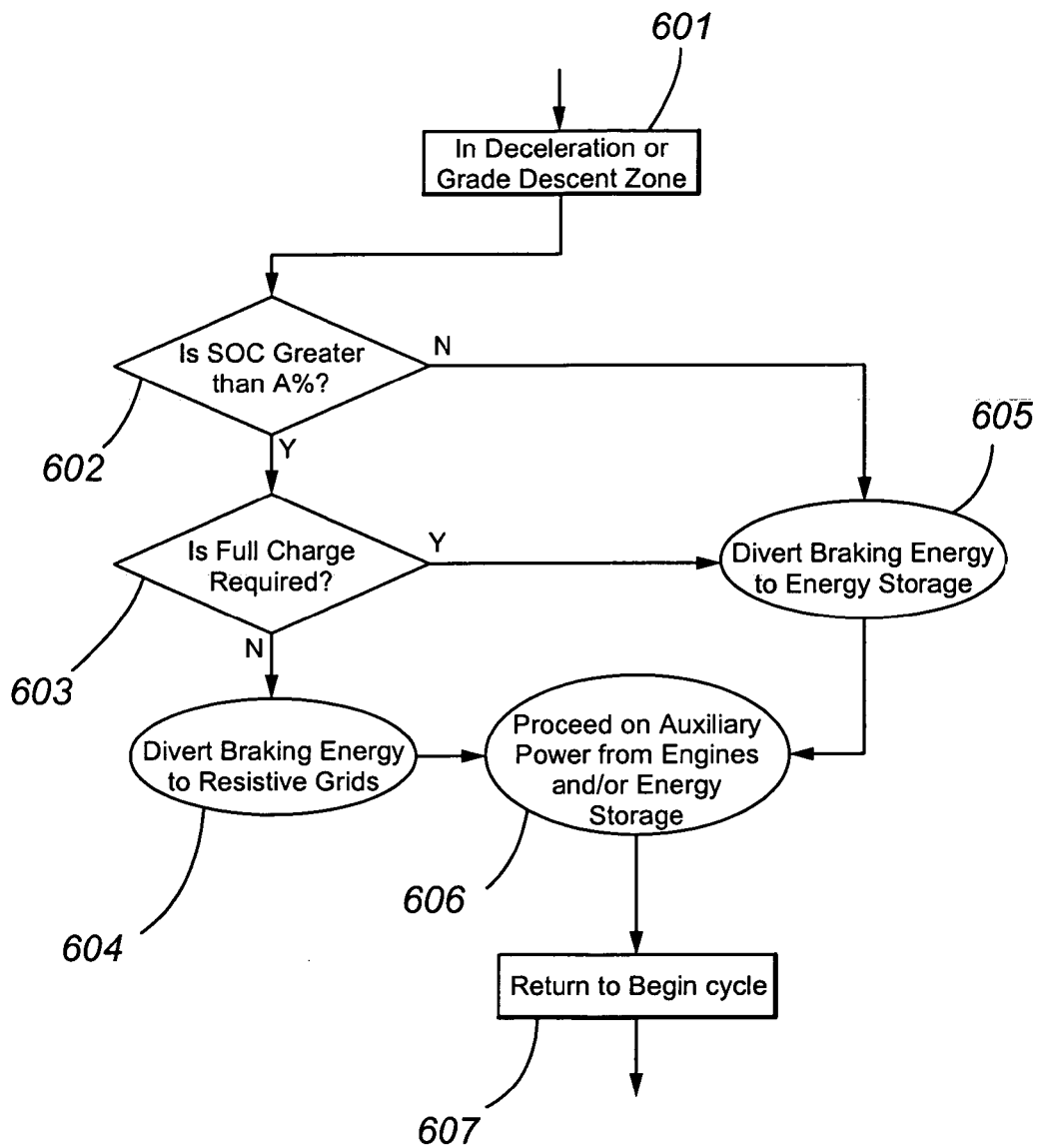
FIG. 6 is an example of a regenerative braking operating mode flow chart.

FIG. 6 is an example of decision making for a hybrid locomotive in regenerative braking mode 601 and refers to FIG. 2b or 2c for SOC references. This mode is typically used whenever the train or a section of the train is decelerating or descending a grade and the traction motors operating as generators are returning energy to the locomotive. If the SOC of the energy storage system is greater than A % 602 and if a full 100% charge 603 is not required, then all the braking energy is diverted to the resistive grids for dissipation 604. If the SOC is not greater than A % 602 or a full charge is required 603, then the energy from braking is sent to the energy storage system 605. Whether braking energy is sent to the resistive grids 604 or to the energy storage system 605, the train continues to brake with auxiliary power being provided by the engine(s) and, if needed, by the energy storage system 606. Once the braking energy is allocated, the algorithm returns to the beginning of the cycle 609.

Figure 7:
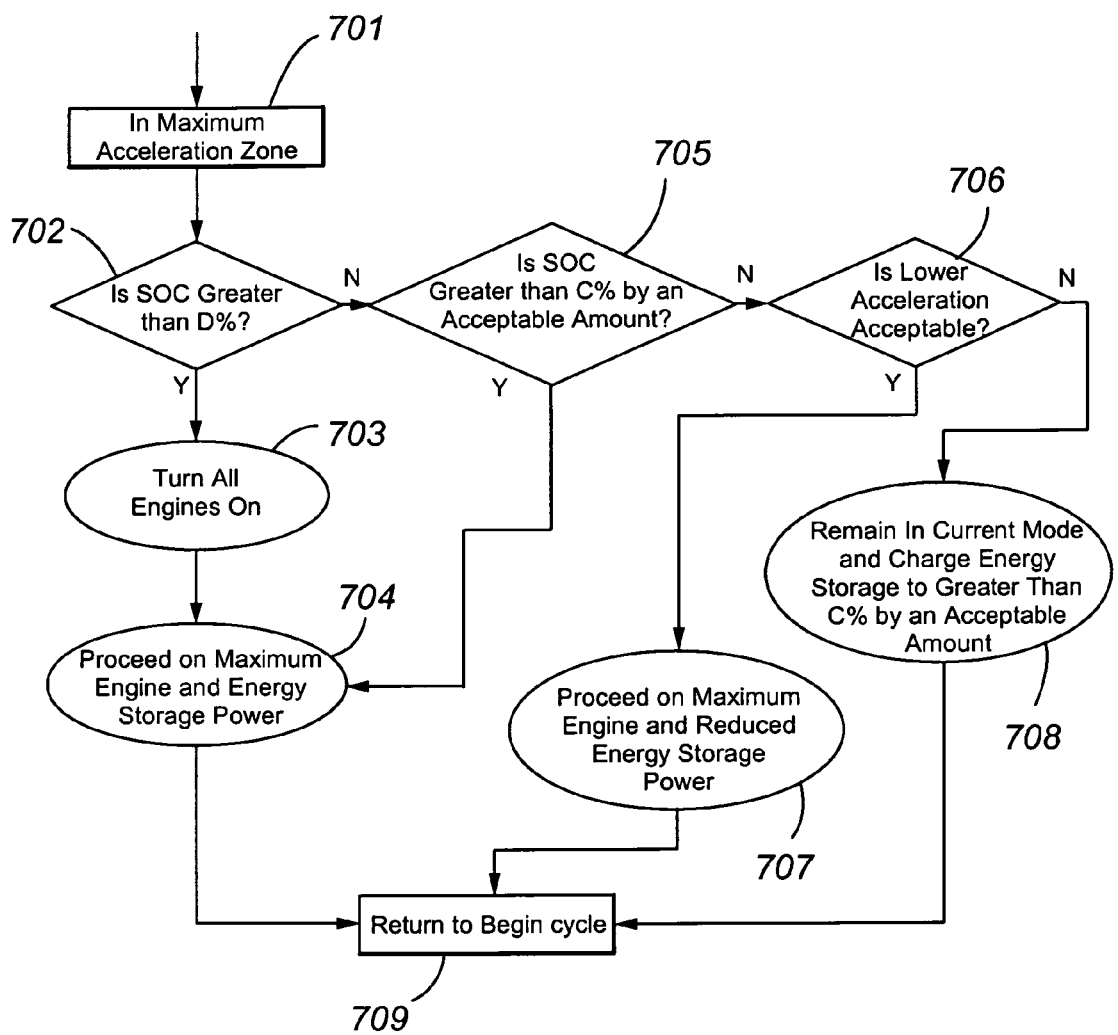
FIG. 7 is an example of a maximum acceleration operating mode flow chart.

FIG. 7 is an example of decision making for a hybrid locomotive maximum acceleration operating mode 701 and refers to FIG. 2b or 2c for SOC references. If the SOC of the energy storage system is greater than D % 702, then all engines are turned on to full power 702 and the energy storage system is also allowed to discharge at full power 703 so that the locomotive is at maximum available power. This mode may be required for exiting stations or accelerating to high speeds in a non-restricted portion of the route. If the SOC of the energy storage system is less than D % 702 but greater than C % by an acceptable margin 705, then all engines and the energy storage system are turned on to full power 704. If the SOC of the energy storage system is less than an acceptable amount above C % 705, then the system can request operation at a lower power level 706. If the request is acceptable, then the locomotive can proceed with all engines are turned on to full power and the energy storage system discharging at the highest power level that will avoid its SOC being reduced below C % 707. If the request is not acceptable, then the locomotive must remain in its current mode (stopped or operating at reduced power), and the excess power capacity of the engine(s) used to charge the energy storage unit to an acceptable amount above C % 708. Once the train can proceed, the algorithm returns to the beginning of the cycle 709.

The present invention involves automatically managing a number of aspects of a hybrid locomotive in each zone or subzone of a known route such as for example a commuter or freight haulage route. A zone is a portion of the route over which one or more variables of the route are constant. Examples of such variables include but are not limited to train speed limit, noise and/or emission restrictions and the like. A zone may be subdivided into smaller subzones.

In a preferred embodiment of the present invention, an important objective is to manage the operation of the engines to comply with various environmental and regulatory restrictions while maximizing engine fuel efficiency, engine and energy storage apparatus lifetimes and minimizing operating costs. As will be shown, this management process is complex and not always suited to manual control. It is the objective of the present invention to disclose an automated hybrid locomotive engine, energy storage and environmental parameter management process that takes advantage of automated knowledge of the train's location at all times along a predetermined route using an on-board route map in conjunction with a locator which determines the locomotive's location and zone.

The following figures illustrate how energy may be allocated from engines, regenerative braking and external sources to an energy storage unit and how the engines and energy storage unit can be orchestrated to supply power for acceleration, auxiliary power, overcoming train resistances and ascending grades under varying environmental restrictions. These principles are applied with emphasis on controlling the operation of the engines to meet various requirements and minimize operating costs, both of which are essential to operating a rail service.

The requirements include but are not limited to the following:
1. environmental restrictions which include emissions and noise. In general but not always, noise increases and decreases with increasing and decreasing emissions.

Zones along the route may have emission restrictions, noise restrictions or combinations of these restrictions.
2. regulatory restrictions which include for example speed limits, mandatory stops and the like.

Operating costs include but are not limited to the following:
1. fuel costs for the engines (affects operating costs). Since some energy is wasted charging an energy storage system, it is always preferable to use engine power directly for propulsion and auxiliary power when possible. Only when engine energy is being wasted is it preferable to route it to an energy storage unit. It is usually preferable to operate the engines in a mode that maximizes fuel efficiency.
2. lifetime of the engines (affects capital costs). Engine lifetime is reduced when the engines are run in peak power generating mode rather than in a lower power mode that, for example, maximizes fuel efficiency. However, it may be necessary to operate the engines at higher than optimum power or even at higher than rated power for short periods of time (typically no more than a few minutes) to achieve a desired acceleration and/or to ascend a grade and/or when auxiliary power demands are high (for example to power air-conditioning on a very hot day). Engine lifetime may also be affected by the decision to idle or turn off the engines when they are not required. It is preferable to idle the engines when engine power is not required so as to maintain oil pressure in the engine's oil galleries. If it is required to turn off the engines (for example to enter an underground station), then it may be necessary to have available pre- and post-lubricating pumps to keep engine components lubricated.
3. lifetime of energy storage apparatus (affects capital costs). For example, a battery pack lifetime can be reduced by overcharging such as by equalization charges or by deep discharges such as with overuse. Under some operating situations, it may be preferable to operate a battery pack between SOC limits typically in the range of 40% to 90%. To maintain the SOC in this preferred range, it is appropriate to leave room for charging by a regenerative braking system and to utilize the engines whenever the SOC is approaching the lower limit. Another factor in battery pack lifetime is maintaining a limit on the rate of discharge, for example when accelerating under combined engine and battery power. A battery pack can be discharged below its lower preferred limit or operated at high current discharge for brief periods when necessary. However, operating beyond the preferred limits, over time, does reduce battery pack lifetime.
4. component failure. In the example of a battery pack, sometimes battery units degrade or fail, resulting in a loss of energy storage capacity. When such failures are detected, then the hybrid power system can be modified to account for a change in storage capacity until the failing or failed units are replaced.

An example of a means by which requirements are met while minimizing costs is illustrated by reference to the following figures.

Figure 8:
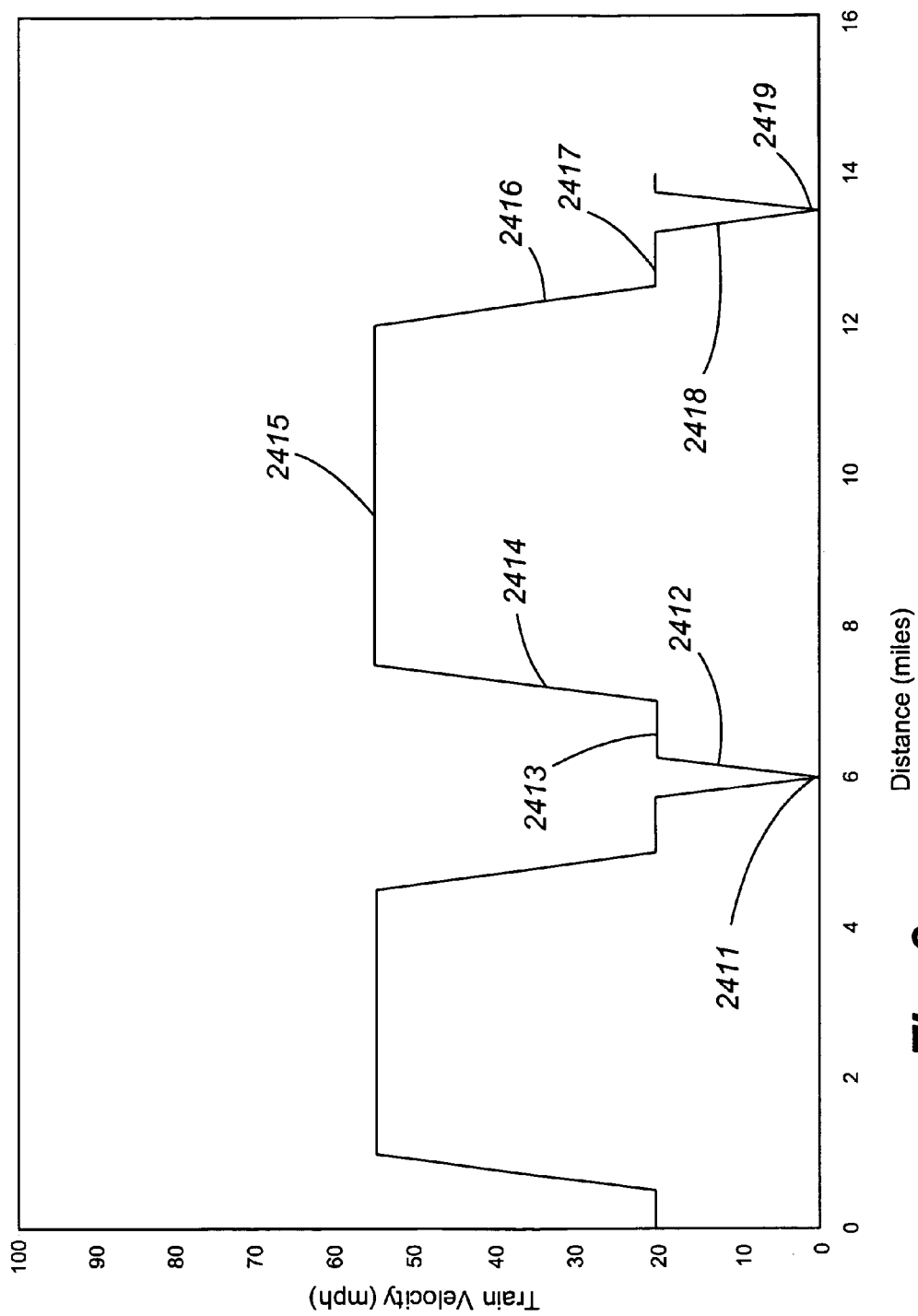
FIG. 8 shows an example of a typical velocity profile between two stations.
Figure 9:
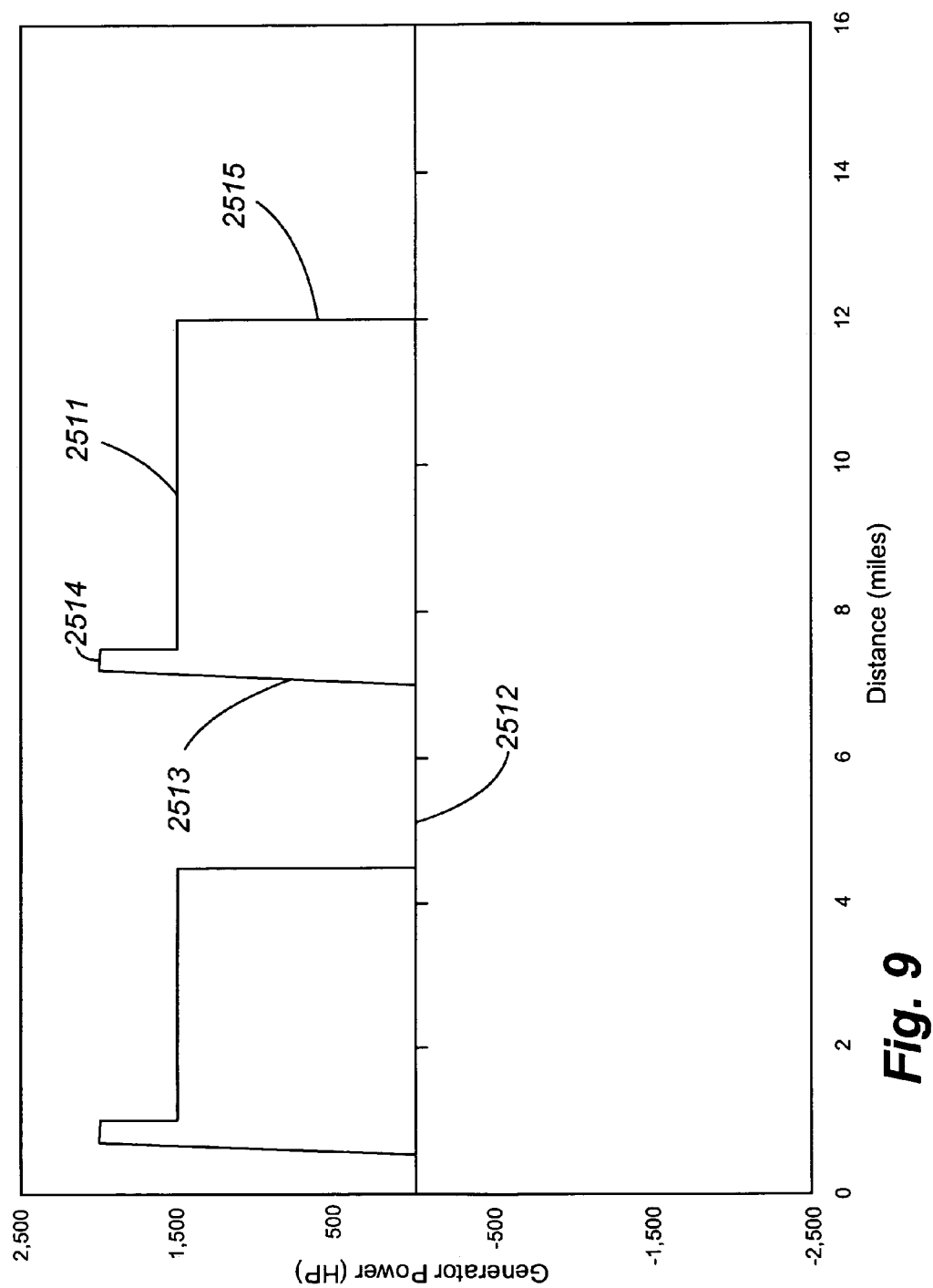
FIG. 9 shows an example of a possible of engine power profile between two stations.
Figure 10:
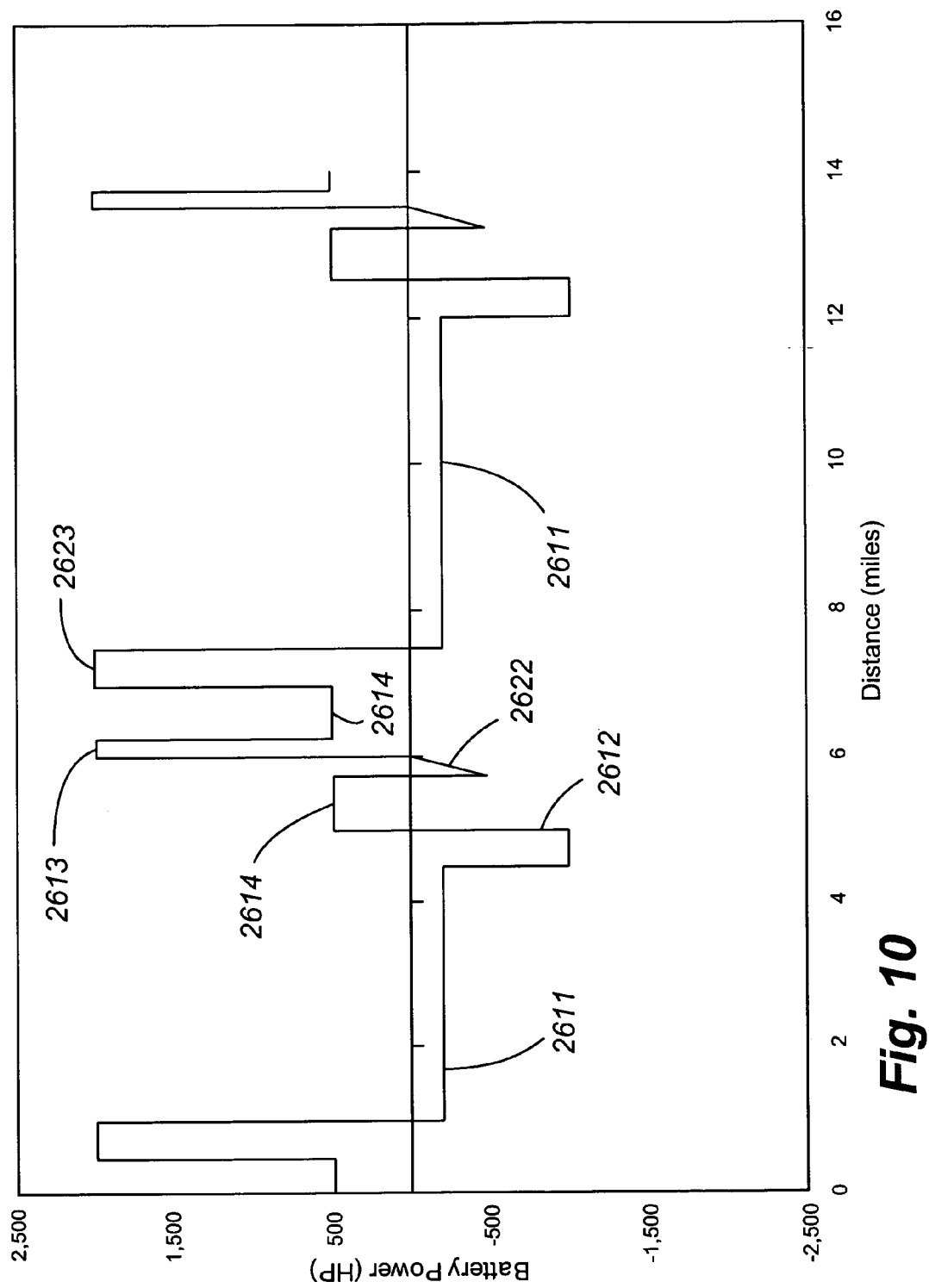
FIG. 10 shows an example of a possible of battery power profile between two stations.

FIG. 8 shows an example of a typical velocity profile between two stations that corresponds to an engine power profile (FIG. 9) and a battery pack power profile (FIG. 10). The locomotive speed is zero when in the station 2411. The train accelerates 2412 out of the station and reaches a constant velocity 2413. After a period at constant velocity 2413, the train then accelerates 2414 until it reaches a higher velocity 2415. The train often but not always spends most of its station-to-station travel time at this high velocity 2415. Eventually, the train decelerates 2416 until it reaches a lower velocity 2417. After a period at constant velocity 2417, the train then decelerates again 2418 until it comes to rest in the next station 2419.

FIG. 9 shows an example of a possible profile of engine power usage between two commuter stations for the velocity profile discussed in FIG. 8. The engines are shown turned off and generating no power 2512 for the zones decelerating from high speed until entering the station, stopped at the station, leaving the station, accelerating to constant velocity and traveling at low speed. This profile would be applied, for example, if no noise or emissions are permitted in the vicinity of the station. When the train reaches the point where the engines can be turned on for acceleration to high speed, the engines are brought up to full power 2514 by a ramp-up 2513 which avoids turbo lag (turbo lag would result in heavy particulate and gas emissions in the case of diesel engines). Once the train has achieved high velocity, the engines are powered down to, for example, maximum fuel efficiency mode 2511 where they are operated to provide power for overcoming train resistances, auxiliary train power (also called hotel power) and, if needed, for charging the energy storage system (a battery pack in this example). When the train is ready to begin decelerating as it approaches the next station, the engines are turned off 2515. Instead of turning the engines off, as in this example, the engines may be set to idle if low levels of noise and emissions are permitted in the vicinity of the station.

FIG. 10 shows an example of a possible profile of battery power between two commuter stations corresponding to the engine power profile of FIG. 9 and velocity profile of FIG. 8. While the engines are shown turned off 2612 for the zones decelerating from high speed until entering the station, stopped at the station, leaving the station, accelerating to constant velocity and traveling at low speed, the batteries, when necessary, provide power for overcoming train resistances and providing auxiliary train power. As the train decelerates from high speed, the braking regeneration system charges the battery pack 2612. During this period the battery pack may continue to supply auxiliary train power, even though net power output is negative 2612 because of the high power input from regenerative braking. As the train moves at lower constant velocity approaching the station, there is no regenerative braking and the battery power input is positive 2614 as it is providing power for overcoming train resistances and providing auxiliary train power. When the train decelerates into the station, the braking regeneration system again charges the battery pack 2622. During this period the battery pack may continue to supply auxiliary train power, even though net power output is net negative 2622 because of the higher power input from regenerative braking. While in the station, train auxiliary power is provided by the battery pack. When the train accelerates out of the station in this example, it does so entirely with battery power 2613 to comply with environmental restrictions of no engine emissions or noise. When the train reaches a low constant velocity zone, battery power is reduced 2614 as it is only required to for overcoming train resistances and providing auxiliary train power. When the train is commanded to accelerate to high speed, both battery power 2623 and engine power (2514 in FIG. 9) are high, providing maximum accelerating power to the train. In this example, when the train reaches its high constant velocity, the engines provide power for overcoming train resistances, providing auxiliary train power and charging the energy storage battery pack. Power output of the battery pack goes to zero and, because of charging by the engines, the net battery power is negative 2611.

Figure 11:
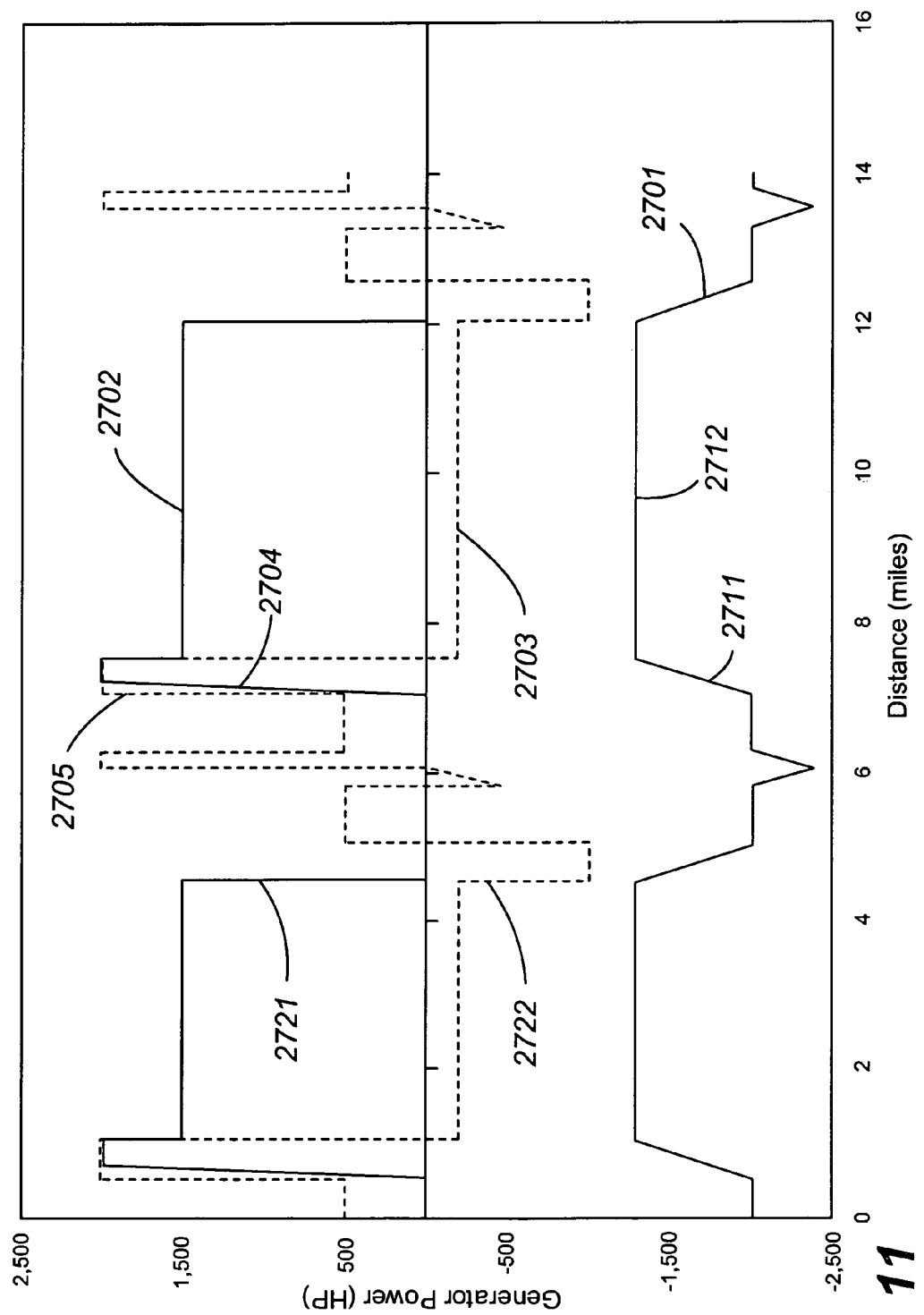
FIG. 11 illustrates the events of the engine and battery operations in relation to the velocity zones of FIG. 8.

FIG. 11 illustrates the events of the engine and battery operation in relation to the velocity zones of FIG. 8. The velocity profile 2701 is shown below the profiles of engine power 2721 and battery power 2722 to further illustrate the locations along the route where the engine and batteries events occur in relation to one another. As an example, when the train accelerates to high velocity 2711, both the engine power output 2704 and battery power output 2705 are turned on to maximum power. Battery power 2705 comes on-line almost instantly while engine power 2704 is ramped-up to reduce turbo-lag emissions. When the train is moving at high speed 2712, the engines are supplying most of the power 2702 including sometimes charging the battery pack. During this phase of the route, the battery pack is not supplying power and is, in this example, absorbing power 2703 as some power from the engines is being used to charge the battery pack.

Figure 12:
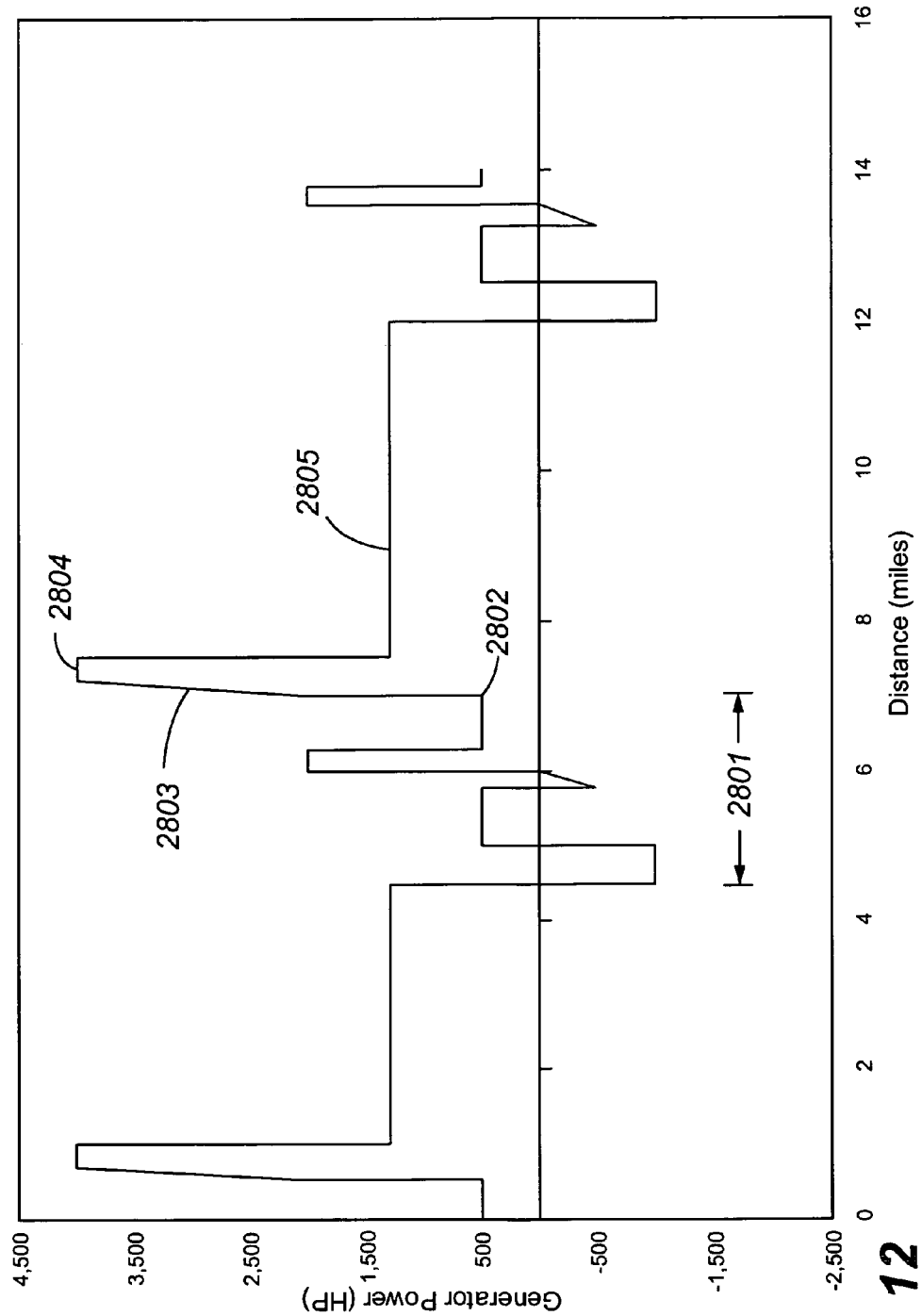
FIG. 12 shows the total power profile corresponding to the engine and battery power profiles of FIGS. 9 and 10.

FIG. 12 shows the total power of the locomotive corresponding to the sum of the engine power profile of FIG. 9 and battery power profile of FIG. 10. The engines are off and the train is operating on battery power only over the section of the route 2801 which, in this example, includes zones entering the station, at the station and leaving the station. When the train begins acceleration to high velocity, battery power output comes on-line almost instantly 2802 while engine power is ramped-up 2803. Maximum locomotive power 2804 is achieved very quickly during this acceleration phase. Once the train has accelerated to a high speed zone, engine power is turned down to a much lower level 2805, for example to maximum fuel efficiency mode, to provide power for overcoming train resistances, for auxiliary train power and for charging the battery pack.

The above power profiles may be modified in a number of ways depending on circumstances. For example, auxiliary train power may be turned down for portions of the route to allow more rapid charging of the battery pack, if necessary. If the train is ascending a grade, then battery power for propulsion may be used in zones where normally the battery pack is not being used or is being recharged.

As used in the descriptions of various embodiments of the present invention, zones (which may also be called segments) have been defined by the preceding examples, as velocity zones based on train speed regimes. For example, velocity zones discussed herein have included stopped, accelerating, constant velocity, decelerating zones. Zones can also be defined by other parameters such as, for example, zones where no engines are on, zones where only one engine is on, zones where more than one engine is on, zones where a certain range of engine power is used, zones where no emissions are allowed, zones where only a certain level of emissions are allowed, zones where emissions are unrestricted, zones where only a certain level of noise is allowed, zones where noise is unrestricted.

Figure 13:
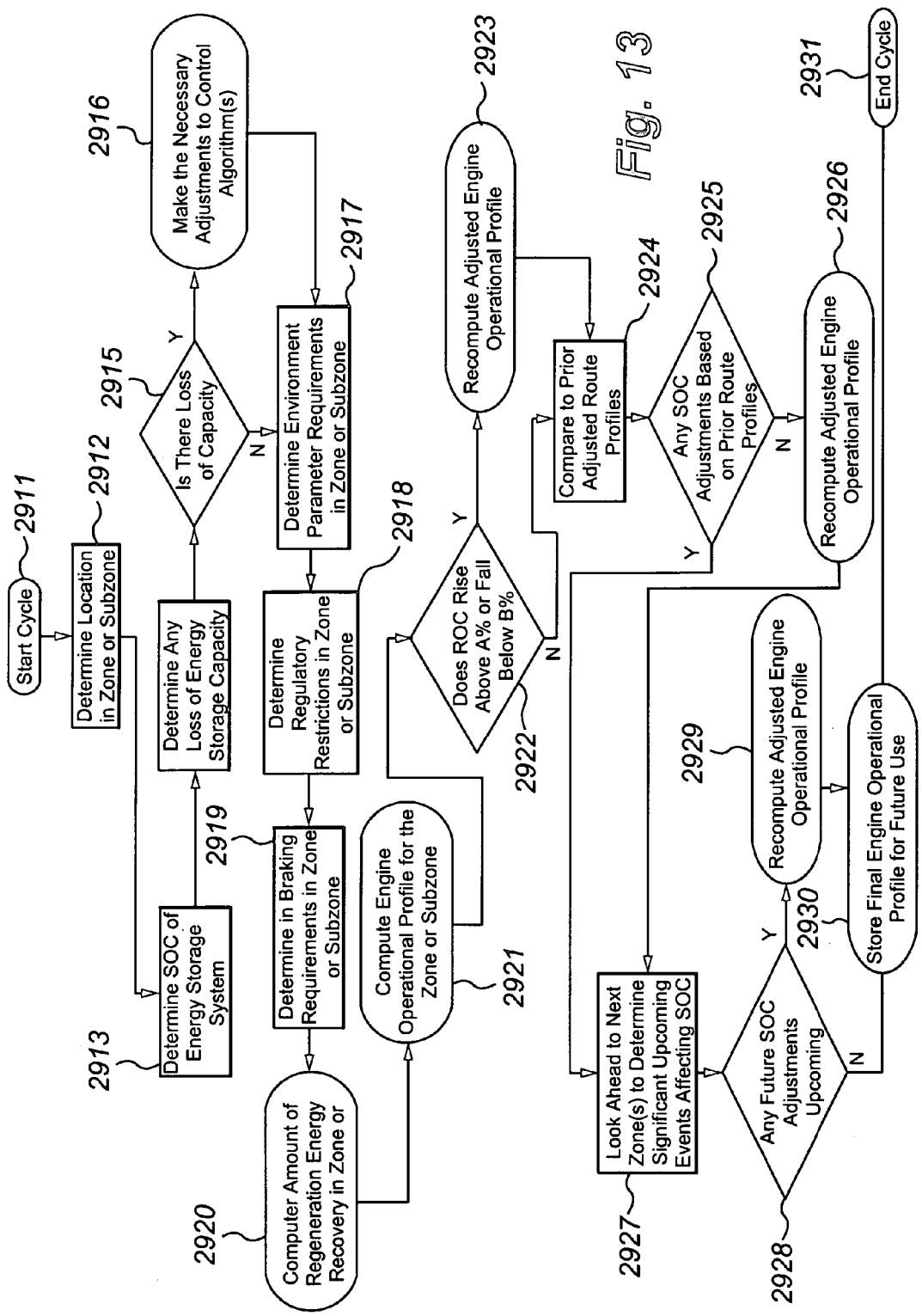
FIG. 13 is an example of a flow chart for automated decision making for controlling engine operation in a zone or subzone that is part of a typical rail route.

FIG. 13 is an example of a flow chart of automated decision making for controlling engine operation in a zone or subzone that reflects measurements and decisions that might be made for the example as illustrated by FIGS. 8 through 12. This cycle of decisions depicted in FIG. 13 can be executed continuously (for example every 1 second) or intermittently (for example every minute) or at intervals in between by a predetermined computer program or by a computer program that adapts, such as for example, a program based on neural network principles. After the cycle is initiated 2911, the location of the train within the current zone or subzone is determined 2912 by means such as described previously. Then the SOC of the energy storage system is determined 2913 by means such as described previously. The capacity of the energy storage system is determined 2914 such as by measuring the voltages or integrated current history associated with the battery pack. Normally, energy storage capacity is approximately constant and very slowly changing over time. There are circumstances such as for example, failing battery units, failed battery units or slow degradation in overall battery pack capacity over time, that can cause energy storage capacity to change. When a change in capacity is detected 2915, then the various control algorithms in the on-board computer program can be modified 2916 to reflect the change. When no change in capacity is detected 2915, then the various control algorithms in the on-board computer program need not be modified. Next, any environmental parameter restrictions applicable to the current zone or subzone are determined 2917. These include for example emissions, noise restrictions associated with operating the prime power engines. Next any regulatory restrictions applicable to the current zone or subzone are determined 2918. These include for example speed limits, caution zones and the like required by the railroad. Next, braking requirements applicable to the current zone or subzone are determined 2919. These include for example zones of deceleration and down grades along the current zone or subzone of the route. Once the braking requirements are determined 2919, the amount of energy that can be recovered by braking can be computed 2920. Once, the state of the energy storage system, environmental, regulatory and braking variables are determined for the current zone or subzone, then a trial operational profile for operating the engines 2921 can be computed for the current zone or subzone. Computing the implementation of this profile can be undertaken to estimate the SOC of the energy storage unit 2922 as the train progresses through the current zone or subzone. If the estimated SOC is projected to fall outside the preferred limits of energy storage unit operation, then the operational profile for operating the engines can be modified 2923, unless exceptions override this potential modification. Such exceptions can be for example, a steep uphill grade that must be negotiated where battery SOC may have to be allowed to fall below the preferred lower limit. If the estimated SOC is projected to fall within the preferred limits of energy storage unit operation, then the trial operational profile for operating the engines 2921 need not be modified. Next, the computer control program can query its database 2924 to compare the trial operational profile for operating the engines with prior operating profiles for the current zone or subzone. The comparison can be made, for example, by progressively narrowing the prior profiles on the basis of descriptors associated with the profiles. For example, prior profiles where the temperature, precipitation, wind and rail conditions are similar would be given a higher weighting than those with significantly different weather or rail conditions. Additionally, prior profiles could be adjusted for number of commuter cars in the train consist and even for passenger load. This process 2925 can be used to adjust 2926, if necessary, the profile for the current zone to ensure that the current profile is adjusted for variables (descriptors) such as outside temperature, precipitation, and wind conditions, passenger load and the like, and is reasonable in light of comparison with prior profiles from the same zone. As part of this process, the hybrid locomotive may be provided with a device for determining outside weather, in addition to its location, at all times and at all locations along its intended route. If such adjustments are warranted based on past similar profiles, the engines may be programmed to provide more or less charging of the energy storage units, more or less auxiliary power to the commuter cars and any other modifications that may be necessary to further optimize the engine operating profile. If there are no substantial profile adjustments dictated by comparison 2925 with previous profiles, then the operational profile for operating the engines need not be modified. Finally, the computer control program can "look ahead" 2927 to determine if any significant events are about to be encountered in subsequent zones that might modify the operational profile for operating the engines. Such events may be for example, long tunnels where engines must be turned off, long uphill grades requiring additional battery power or long downhill grades requiring substantial battery capacity to absorb regeneration energy. If such events are identified 2928, they may require modifying the operational profile for operating the engines 2929. For example, the engines may be programmed to provide additional charging of the energy storage unit if a long tunnel and/or a long uphill grade will be encountered in a subsequent zone or subzone. Alternately, the engines may be programmed to provide less charging of the energy storage unit if a downhill grade will be encountered in a subsequent zone or subzone and substantial regeneration energy is expected to be available for charging the energy storage unit. If there are no substantial events identified in the "look ahead", then the operational profile for operating the engines need not be modified and the final operational profile for operating the engines can be stored in the data base 2930 for future use. Thereupon, the decision cycle can be completed 2931.

The present invention is further illustrated by an example of a hybrid locomotive and commuter cars operating over a typical rail commuter route in a large urban area which may be comprised of a number of separate cities and towns. In this example, a hybrid locomotive is used to pull several air-conditioned (or heated depending on the season) commuter cars on a round trip between two terminus stations. The route has a no net elevation change but does have a significant elevation change between the terminus stations. The route includes a portion near one terminus where the line passes through a long tunnel which is too small to permit the use of internal combustion engines. The train has a regenerative braking system that can recover much of the kinetic energy of the train when decelerating or when descending a grade. The energy required for air-conditioning, other auxiliary power requirements and for various losses such as rail friction, flange friction on curves and wind resistance etcetera is irrecoverable.

In an emissions strategy, it is desired to make the best use of available energy-generating sources. These include:
- on-board engines which, when in operation, produce emissions
- regenerative braking systems which recapture energy used previously to accelerate the train
- external energy sources which include:
    - third electrified rails (emissions generated elsewhere)
    - overhead catenaries (emissions generated elsewhere)
    - railside generators which, when in operation, produce emissions
    - railside energy storage units which obtain their energy from various sources including regenerative braking energy delivered from prior locomotives that have exceeded their on-board energy storage capacity (no emissions produced)
    - rail side connections into a power grid (emissions generated elsewhere)

It is an important that some or all of the above external energy-generating sources be part of the energy resources available to the hybrid locomotives of the of the present invention. This is because a number of these external energy-generating sources produce emissions in locations far removed from the operational territory of the locomotive of the present invention and therefore do not contribute emissions to the operational territory of the locomotive and train where emissions requirements may be in force.

The principal train parameters for this example are given in the following tables.

| Train | |
|---|---|
| Total Train Mass (tons) | 700 |
| Number of Locomotives | 1 |
| Number of Commuter Cars | 10 |
| Air Conditioning (kW per car) | 20 |
| Draw Bar Power of Locomotive (HP) | 3,500 |

| Battery Pack | |
|---|---|
| Maximum Allowable Current (A) | 1,250 |
| Maximum Draw Bar Power Rating (HP) | 1,400 |
| Capacity Rating (kW-hrs) | 1,440 |
| Cell Configuration | 450 each 2.1 volt cells in series |

| Engines and Efficiencies | |
|---|---|
| Total Engine Draw Bar Power Rating (HP) | 2,060 |
| Battery Charging Efficiency | 95% |
| Drive Train Efficiency | 94% |
| Regenerative Braking Recovery Efficiency | 85% |

In the above scenario, the train is stopped at the originating terminus station (station A) for 5 minutes, at intermediate stations for 1 or 2 minutes, and at the destination terminus station (station B) for 5 minutes. The train accelerates out of all stations on engine and battery to a low velocity and maintains this speed for a short distance. The train then accelerates to its maximum speed again using both engine and battery power until the high speed portion of the route. This high speed is maintained primarily on engine power. The engines are then idled or turned off until the train decelerates by braking and enters a low speed zone approaching the next station. The train maintains this lower speed for a short distance then decelerates by braking to a stop at the next station. In this example, the engines are always turned off while decelerating into a station and while stopped in the station. In this example, the engines are not used to charge the energy storage battery pack.

In this example, there is a long tunnel and a down grade before the train enters an underground station which is the destination terminus station. The engines must be turned off in the tunnel and in the underground station. On the return trip, the train must leave the station and ascend the grade in the tunnel, again with the engines turned off.

In this example, energy is returned to the energy storage unit by regenerative braking and by recharging from an external source at terminus station A at the end of a commuting cycle. There is no energy returned to the energy storage system by the engines. This is an example of a low emissions operating strategy over most of the route and a zero emissions operating strategy over a substantial portion of the route.

Figure 14:
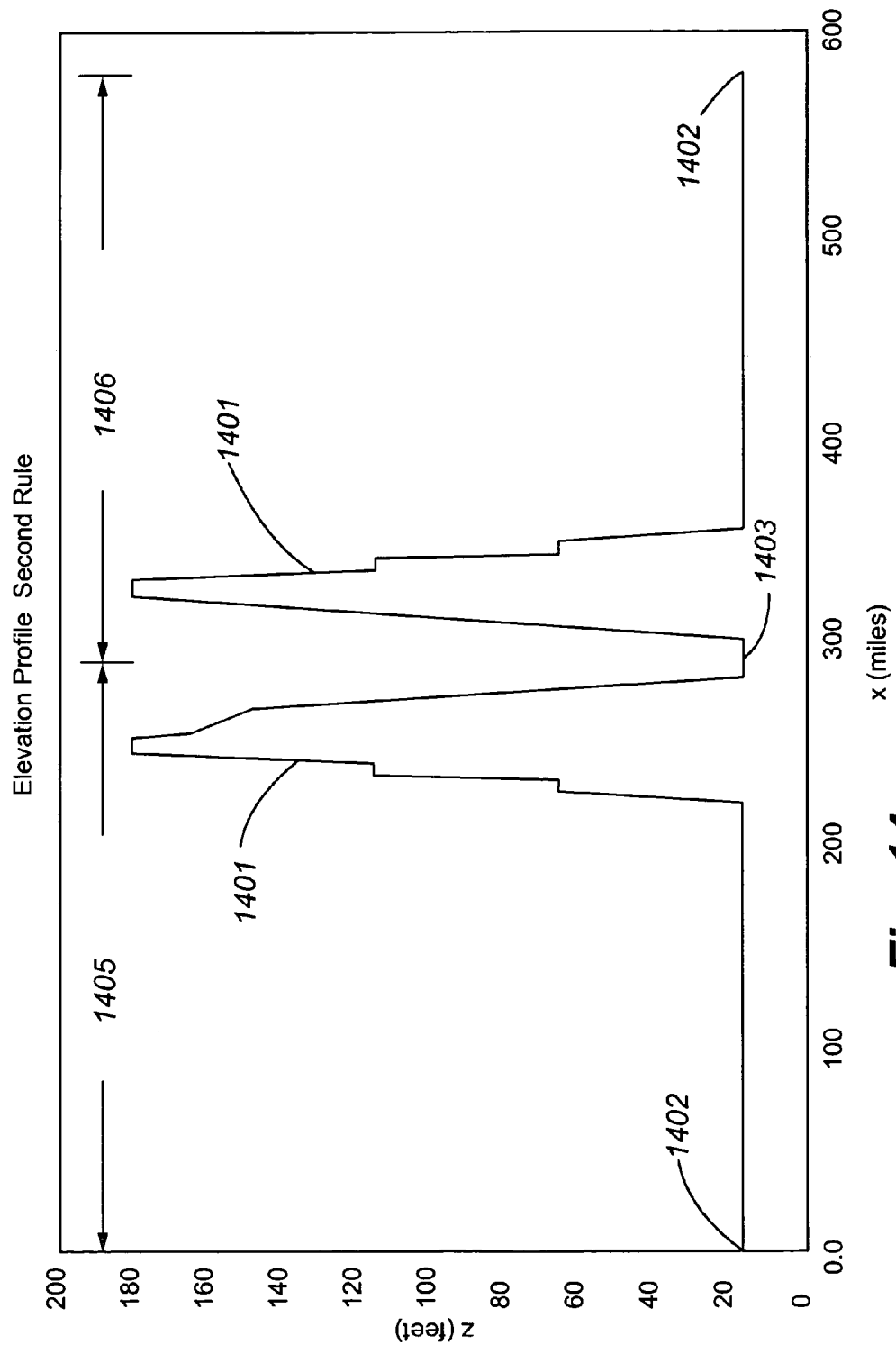
FIG. 14 shows an example of a grade profile over a typical rail commuter route.

The elevation profile of the route and location of the tunnel shown in FIG. 14. The route begins at terminus station A 1402 and arrives at terminus station B 1403 over a distance of 29 miles. The round trip back to terminus station A 1402 is thus 58 miles. In this example, the route has an elevation change 1401 near the destination terminus station where the grade rises approximately 160 feet then returns to approximately its original value 1403. The net elevation change between the originating terminus station and the destination terminus station is approximately zero such as would be the case, for example, if the terminus stations were both at sea level. In this example, the locomotive can recover energy from a regenerative braking system when it is used during deceleration into stations or used to control speed going down grade.

Figure 15:
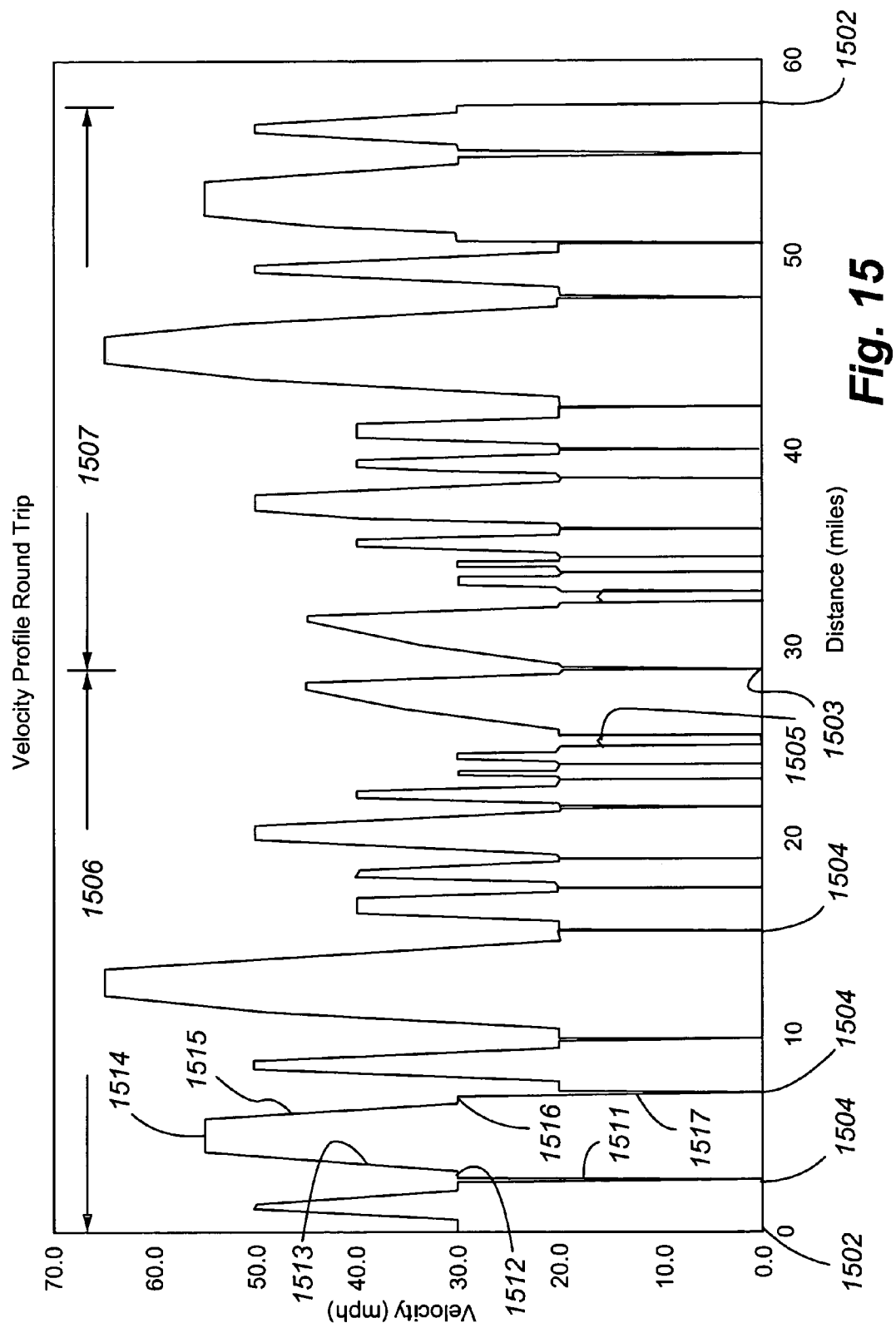
FIG. 15 shows an example of station to station velocity profiles over a typical rail commuter route.

The velocity profile of the route is shown in FIG. 15 which shows the locations of the two terminus station A 1502 and station B 1503 and the 11 intermediate stations 1504. The velocity profiles from the originating terminus station 1502 to the destination terminus station 1503 are identical, being a mirror images, to the velocity profiles for the return leg from station 1503 to station 1502. The form of the velocity profiles between each station are all similar except for the route segment 1505 which is too short for the train to accelerate to a high velocity zone. Between most stations there is a zone leaving the station of acceleration to low velocity 1511, a zone of constant speed at low velocity 1512, a zone of acceleration to high velocity 1513, a zone of constant speed at high velocity 1514, a zone of deceleration to low velocity 1515, a zone of constant speed at low velocity 1516, and finally a zone of deceleration to a stop 1517 in the next station.

These route parameters and velocity/acceleration conditions are for illustrative purposes only. They serve to illustrate how energy is typically managed for emissions control between the locomotive engines and its energy storage system.

Figure 16:
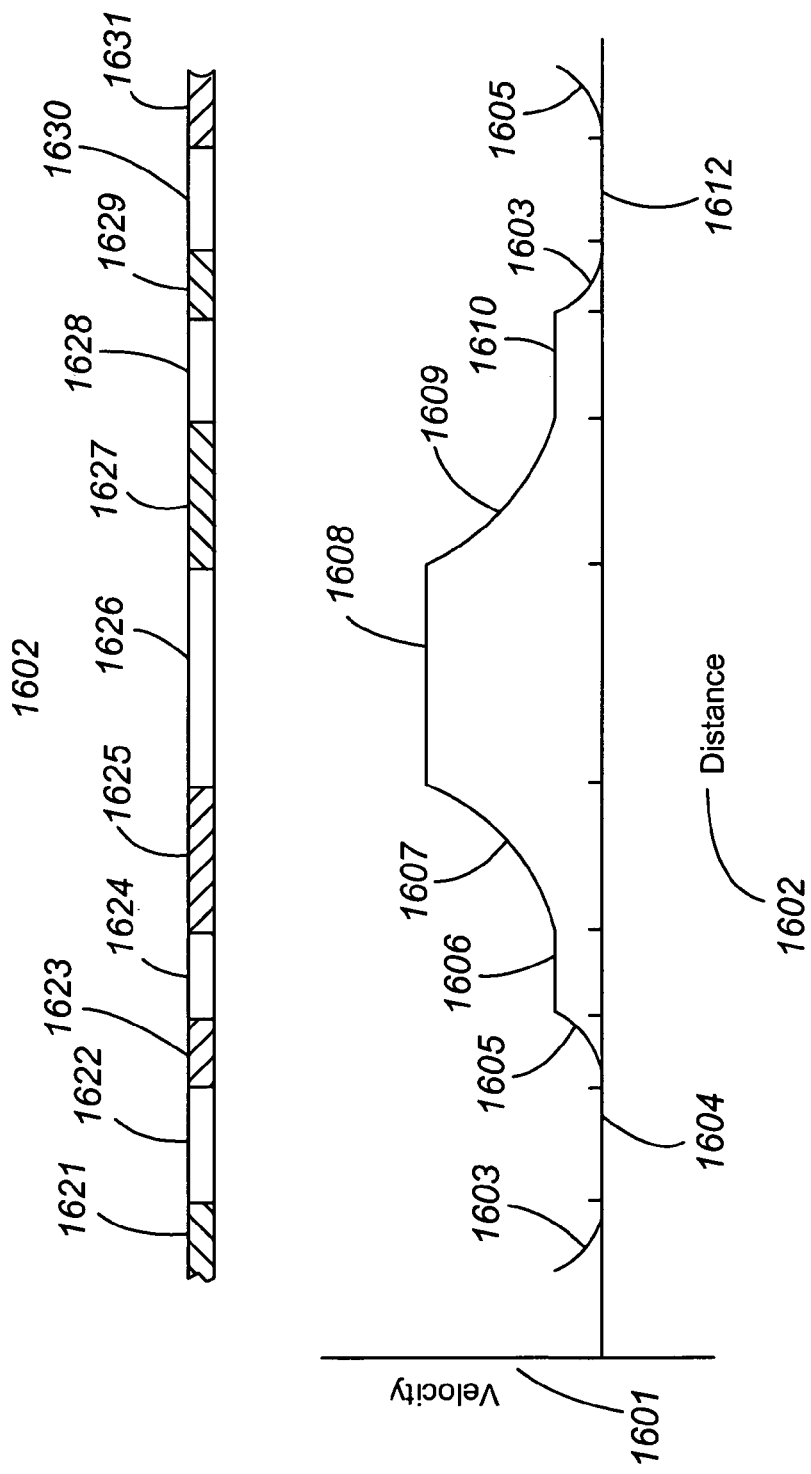
FIG. 16 is a schematic of a portion of a rail commuter route from a station to another station showing examples of various zones.

FIG. 16 is a schematic representation of a typical velocity 1601 versus distance 1602 profile and engine operating mode zones 1602 associated with two intermediate stations 1604 and 1612. The velocity profile is comprised of the following zones which are meant to be illustrative examples.

in the station 1604
accelerating to low velocity 1605
constant speed at low velocity 1606
acceleration to high velocity 1607
constant speed at high velocity 1608
decelerating to low velocity 1609
constant speed at low velocity 1610
decelerating to a stop in a station 1611
in the next station 1612

The structure of the various engine operating mode zones 1602 shows when the engines are idled or turned off, turned on to boost acceleration, turned on to maintain constant speed at near optimum fuel economy and idled or turned off when braking. In this example, each engine operating mode zone corresponds to a zone in the velocity profile. The engines are idled or turned off in zones 1622 and 1630 which are the velocity zones in the stations 1604 and 1612. The engines are idled or turned off in zones 1621, 1627 and 1629 which correspond to deceleration velocity zones 1603, 1609 and 1611 (braking). The engines are operated at or near maximum fuel economy in zones 1624, 1626 and 1628 which are the constant velocity zones 1606, 1608 and 1610. The engines are turned on to at or near full power in acceleration zones 1623, 1625 and 1631 which are the velocity zones where the train accelerates to low velocity 1605 and where the train accelerates to high velocity 1607. Some of the engines may be turned off in the high speed zone 1608. In this zone, the engines may be turned off when the power required is below a predetermined level and/or the train is descending a grade and using the regenerative braking system to control speed and charge the batteries without engine emissions.

Figure 17:
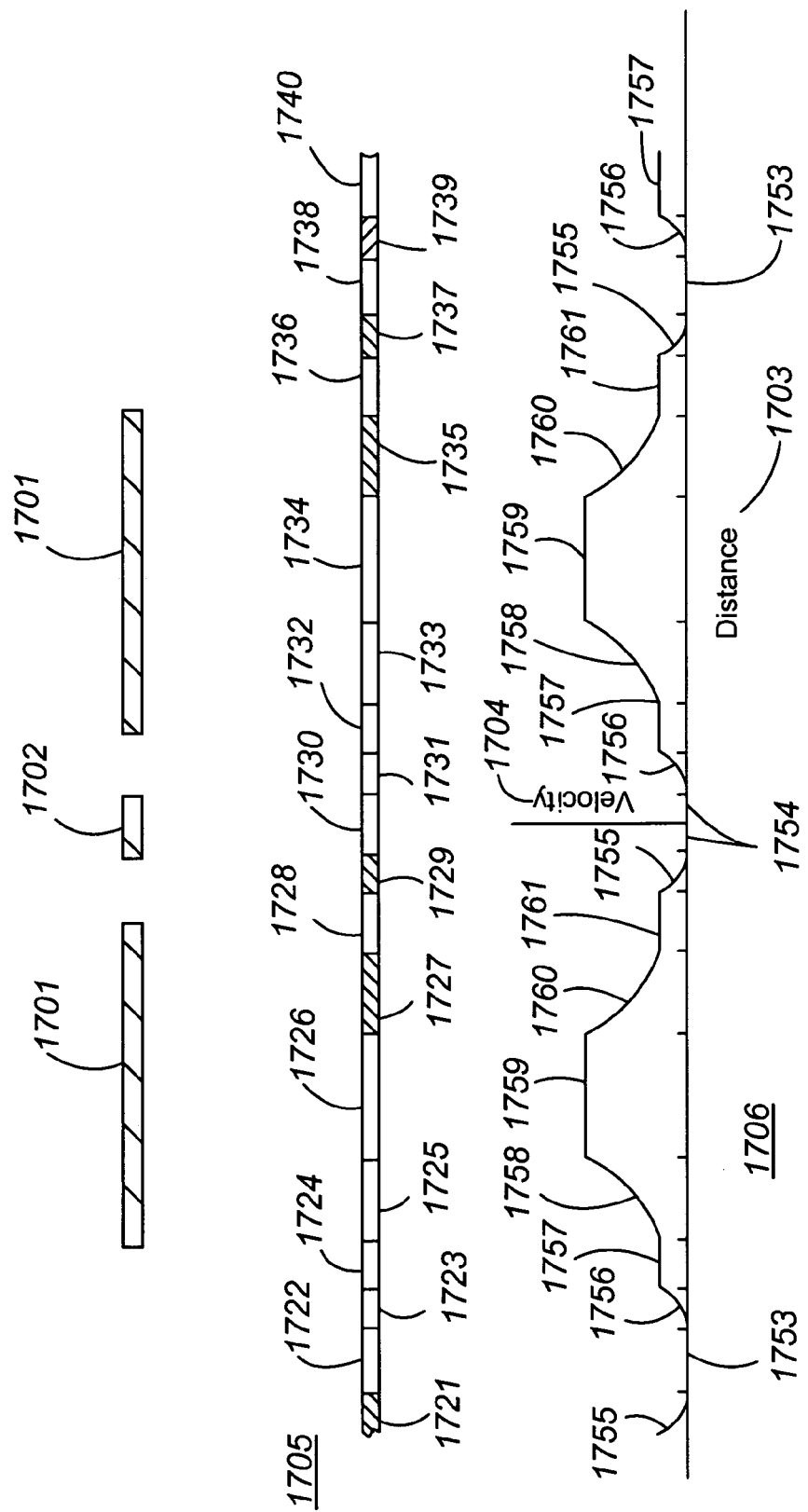
FIG. 17 is of a portion of a rail commuter route to a terminus station showing examples of various zones.
Figure 18:
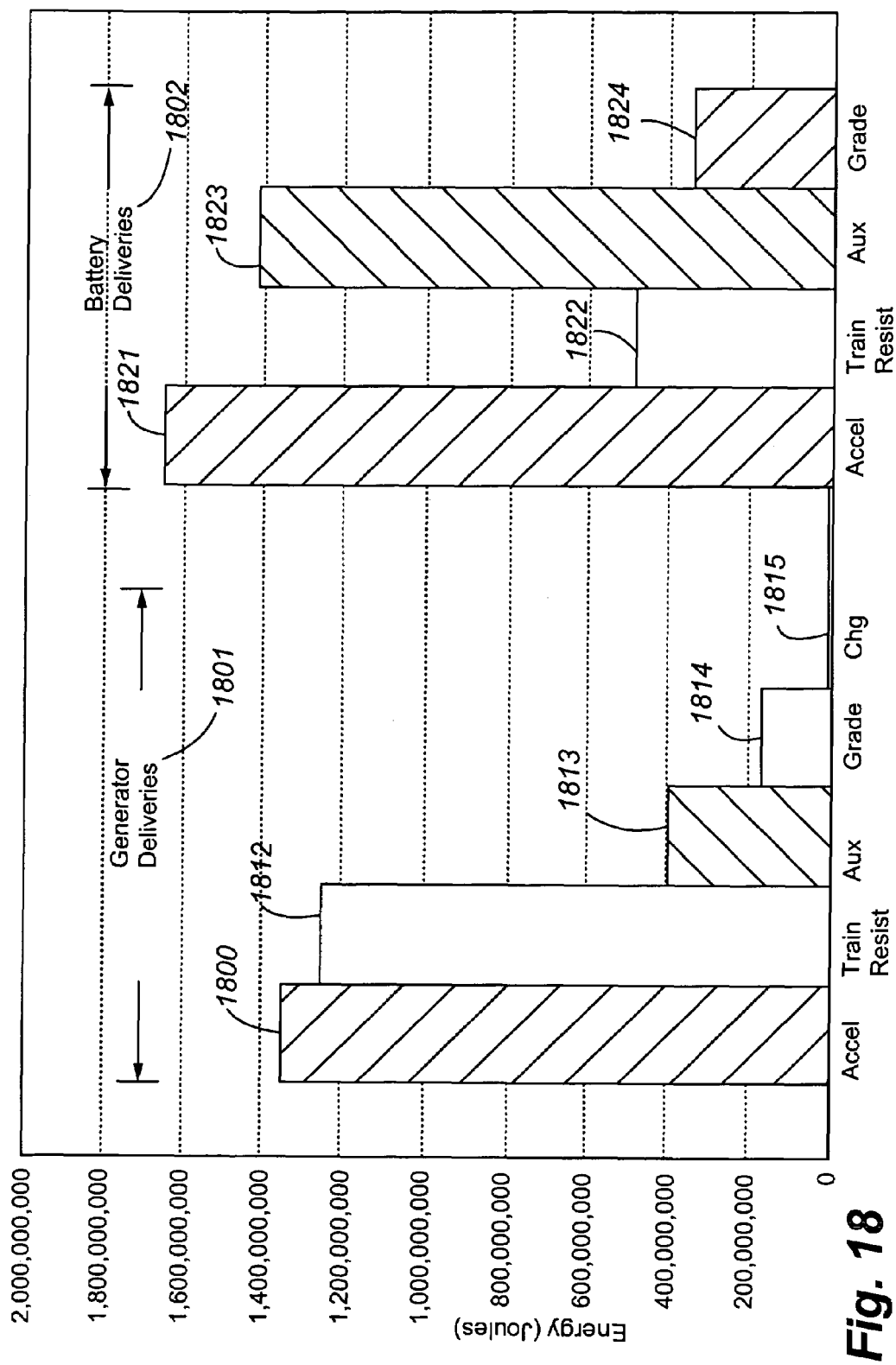
FIG. 18 shows the amounts of energy delivered by the engines and the battery pack for various purposes for a typical round trip rail commuter route.

The structure of the various engine operating mode zones 1705 and velocity zones for the destination terminus station (station B) for this example are illustrated in FIG. 17 which shows when the engines are turned off in the tunnel and underground station, turned on to boost acceleration, turned on to maintain constant speed at near optimum fuel economy and idled or turned off when braking. In addition, the location of a tunnel 1701 and an underground portion 1702 of the terminus station are shown. In this example, the train leaves the last intermediate station and descends a grade as it passes through the tunnel towards the terminus station B. When the train leaves terminus station B, it ascends the grade as it passes through the tunnel towards the intermediate station it last visited.

The velocity profile 1706 is comprised of the following zones which are meant to be illustrative examples.

in the last intermediate station 1753
accelerating to low velocity 1756
constant speed at low velocity 1757
acceleration to high velocity 1758
constant speed at high velocity 1759
decelerating to low velocity 1760
constant speed at low velocity 1761
decelerating to a stop in terminus station B 1755
in terminus station B 1754

The engines are turned off in engine operating mode zones 1725 through 1735 which are the engine operating mode zones in the tunnel 1701, between the tunnel 1701 and the underground station 1702 and in the underground station 1702. The engines are turned on to boost acceleration in engine operating mode zones 1723 and 1739 which are acceleration velocity zones 1756 out of station 1754 and 1753. The engines are idled or turned off in engine operating mode zones 1722 and 1738 which are the velocity zones in the station 1753. The engines are idled or turned off in engine operating mode zones 1721 and 1737 which correspond to deceleration velocity zones 1755 (braking). The engines are operated at or near maximum fuel economy in engine operating mode zones 1724, 1736 and 1740 which are the constant low velocity zones 1757 and 1761.

While the engines are turned off in engine operating mode zones 1725 through 1735, all of the train energy is provided solely by the energy storage system. While the train is stopped in the underground station 1702, the energy storage system can be partially or fully recharged by plugging into an external source such as a local power grid. In the present example, this was not necessary. As the train leaves the terminus station 1754 to return to station 1753, it ascends the grade inside tunnel 1701 under battery power only. This is the most taxing part of the route for the battery pack.

In this example, the engines are used for boosting acceleration and providing some of the auxiliary power to the train, and providing propulsion power for ascending grades and operating over the high speed portions of the route. As noted above, the engines are turned off completely over the portion of the route in the tunnel to terminus station B and back through the tunnel.

The engines are not used to recharge the energy storage system. The energy storage system is used to provide most of the auxiliary power to the train. This is not the most energy efficient operation but it is the most emissions efficient operation. The energy inefficiency is absorbed by the local power grid charging system at the end of the commuter cycle in terminus station A and the emissions associated with this are generated elsewhere, outside the operating territory of the train. This operating strategy requires less use of the engines inside the operating territory of the train.

The average locomotive engine power over the route is less than 500 HP which is well below the rated engine power of the locomotive (2,000 HP in this example). FIG. 16 shows the amounts of energy delivered by the prime energy source 1801 and the energy storage unit 1802 for various purposes for the closed loop route from station A to station B and then returning to station A. None of the engine energy is used for charging 1815 the energy storage unit. Approximately equal amounts of the energy produced by the engines is used to boost locomotive acceleration 1811 and to overcome train resistances 1812. Lesser amounts of engine energy are used for providing auxiliary power 1813 and ascending grade 1814. The energy storage unit (a battery pack in this example) supplies most of its energy to provide acceleration 1821 and then to supply auxiliary power 1822. The energy storage system provides some of the energy 1822 to overcome train resistances and ascending grade 1824. The sum of energy dispensed by the battery pack is considerably greater than the energy provided by the engines. The difference is made up by the energy received from the external power grid at terminus station A at the end of a route cycle.

Figure 19:
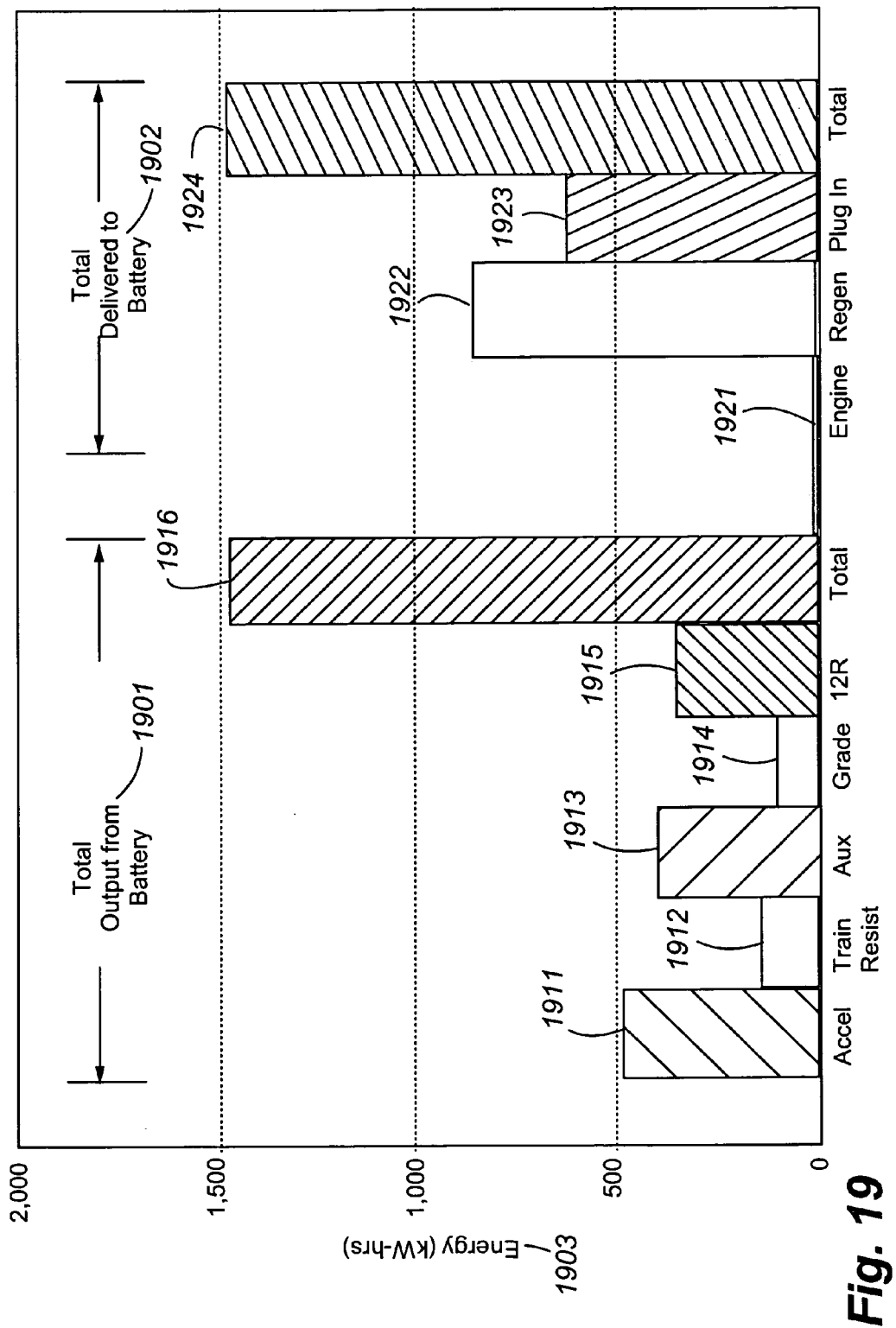
FIG. 19 shows the sources of energy input and output for the battery pack for a typical round trip rail commuter route.

FIG. 19 shows the sources of energy inputs 1901 to energy storage unit and energy outputs 1902 by the energy storage unit for the closed loop commuter route from station A to station B and then returning to station A. In general, the total inputs 1924 should be close to equaling the total outputs 1916 to restore the SOC of the battery to approximately to its starting value. In this example, which employs a low emissions operating strategy, there are no inputs from the engines 1921. The primary input of energy is from the regenerative braking system 1922. At the end of a route cycle, the energy needed to restore the battery to its desired SOC is provided by an external source 1923 such as for example a plug into a local power grid at terminus station A. The output sinks of energy from the energy storage unit are to accelerate the train 1911, to provide auxiliary power 1913, to overcome train resistances 1912, to ascend grade 1914 and to account for internal resistive losses 1915 from the energy storage unit. When operating in a low emissions mode and not utilizing the engines to recharge the energy storage system, an external source of energy input 1923 will always be needed. This is because braking energy cannot be fully recovered and energy supplied for auxiliary train power, overcoming train resistances and battery $I^2R$ losses are unrecoverable.

As can be appreciated, there are other operating strategies that can further reduce emissions, such as for example, operating the engines only for boosting acceleration. These strategies are typically not the best energy management strategies from a fuel consumption perspective but they may be mandated in areas of high pollution.

It is also noted that operating on the energy storage system with minimal engine usage, results in lower noise, since the principal source of this is from the engines, especially from large engines.

Figure 20:
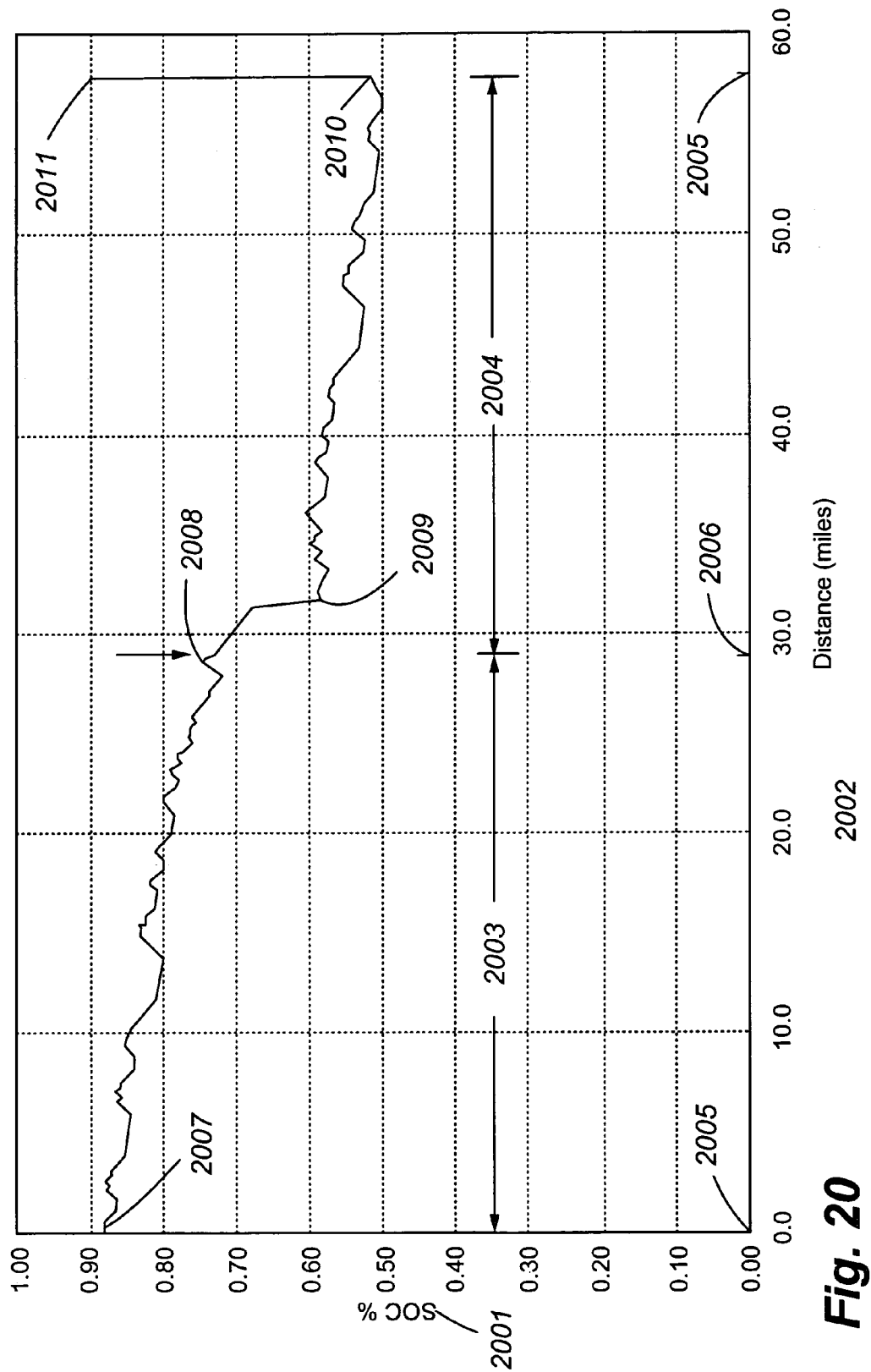
FIG. 20 shows the SOC of the battery pack for a typical round trip rail commuter route.

FIG. 20 shows the SOC 2001 of energy storage system versus distance 2002 over the commuter route which begins at the originating terminus station 2005, continues to the destination terminus station 2006 and then returns to the originating terminus station 2005. The SOC is initially about 90% 2007 in this example, and slowly declines to about 75% 2008 as the train reaches the destination terminus station 2006, benefitting from charging by the regenerative braking system as it descends the grade into the terminus station 2006. In this example, the SOC drops to a low of 60% 2009 after the train has left the terminus station 2006, has ascended the grade in the tunnel and has emerged from the tunnel under battery power only. Once the train returns to the level portion of the route, the SOC slowly declines to approximately 50% 2010 as the train arrives at the originating terminus station 2005. The SOC of the energy storage unit is then returned to its desired starting value of approximately 90% 2011 by being recharged from an external source. The requirement to operate on battery only while in the tunnel and the destination terminus station 2006, dictates the size of the battery and engines more than any other single factor in this example. The engines operate at about 25% of their capacity over the full route. In this example, the battery throughput is approximately 2,700 ampere-hours which is a small portion of its expected lifetime.

The following embodiments, involve operating a consist of locomotives, at least one of which is a hybrid locomotive. An important feature of these embodiments is that the consist must have the ability to operate in emissions free mode over a significant portion of its route such as for example a long tunnel or an underground station where the train must stop for a reasonable period of time.

Figure 21:
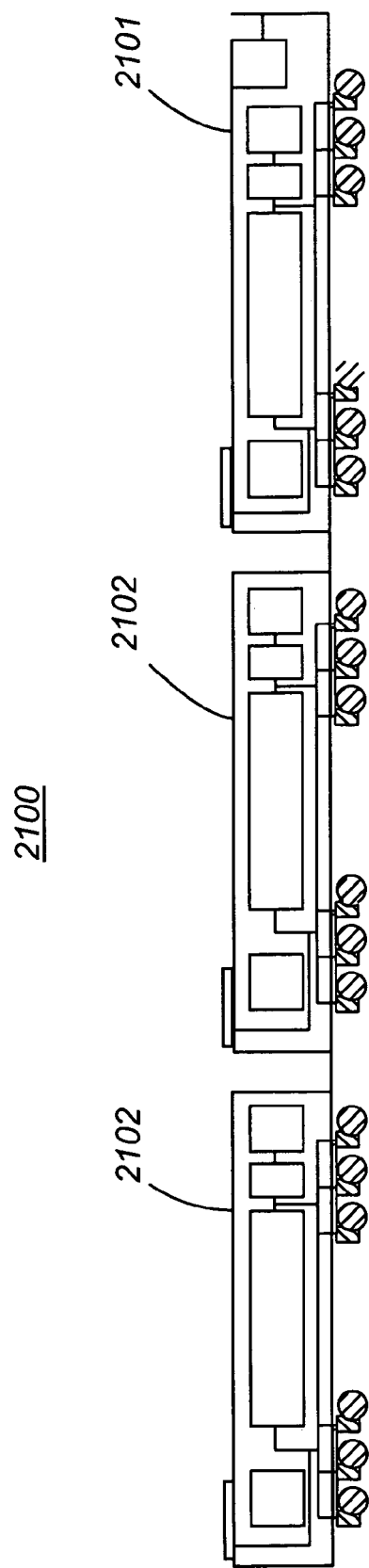
FIG. 21 is a schematic side view of small consist of hybrid locomotives according to an embodiment of the present invention.

FIG. 21 is a schematic side view of an example of a consist of hybrid locomotives. A locomotive consist may be comprised of two or more locomotive types, including at least one or more locomotives which are fully independent, one or more cabless hybrids serving as B-units, one or more energy storage tender cars. Members of the consist need not be adjacent to one another and can be located anywhere in the train. As an example, the consist shown in FIG. 21 is comprised of an independent hybrid locomotive 2101 and two cabless hybrid locomotives 2102.

In a first consist embodiment, at least two of a hybrid locomotive and energy tender car can form a locomotive consist where the operation of each hybrid locomotive and energy tender car has the autonomous ability to operate in all the operational and environmental states described above. As can be appreciated, a lead locomotive is typically used for issuing power and braking commands to all the consist members, otherwise each member manages its own operational and environmental states described above. This embodiment might be preferred, for example, if all members of the consist have same configurations of hybrid locomotives and energy storage tender cars. In this embodiment, all of the members of the consist must have a regenerative braking system since they all must act autonomously.

In a second consist embodiment, at least two of a hybrid locomotive and energy tender car can form a locomotive consist where the operation of all of the members of the consist is co-ordinated to maximize the effectiveness of the operational and environmental states described above, by a master controller in communication with all the members of the consist. This embodiment might be preferred, for example, if various members of the consist have differing configurations of hybrid locomotives and energy storage tender cars. In this embodiment, all of the members of the consist must have a regenerative braking system since they all must be able to supply enough energy to operate in emissions free mode for a substantial portion of the route.

In a third consist embodiment, at least two of a hybrid locomotive and energy tender car can form a locomotive consist where the operation of all of the members of the consist is co-ordinated to maximize the effectiveness of the operational and environmental states described above, by a master controller in communication with all the members of the consist and with the ability to allocate energy between the various members of the consist. This latter feature means that consist members are interconnected by a direct current power bus for exchanging electrical energy. This embodiment is most preferred for all configurations of hybrid locomotives and energy storage tender cars since imbalances in energy storage between members can be corrected. In this embodiment, at least one of the members of the consist must have a regenerative braking system, although it is preferred that most of the consist members have a regenerative braking system.

In a fourth consist embodiment, a method is provided for managing the environmental states of a consist of locomotives where at least one of the members of the consist is a hybrid locomotive and wherein the consist can be operated at low emissions or zero emissions mode over a substantial portion of its route. In this embodiment, the non-hybrid members of the consist may be required to be idled (low emissions mode) or to be turned off (zero emissions mode) for a required substantial portion of the route. The consist is managed by a master controller in the lead hybrid locomotive and is in communication with all the members of the consist. This embodiment is applicable for consists which may contain non-hybrid members such as conventional diesel-electric or diesel-hydraulic locomotives. If consist members are interconnected by a direct current power bus for exchanging electrical energy, then the master controller may have the ability to allocate energy between the various members of the consist. This would include being able to transfer energy to or from the traction motors of the non-hybrid members of the consist.

In another embodiment, at least two of a hybrid locomotive and energy tender car can form a part of a locomotive consist having one or more independently controllable features. These independently controllable features may include, for example, the total amount of tractive effort applied, the operation of the prime power sources, the amount of stored energy used, the amount of power applied by either or both of the prime power sources and energy storage systems, control of wheel slip, control of wheel skid, amount of regenerative braking energy stored and amount of energy, if any, transferred to other locomotives in the consist. Independent control of features such as described above can be effected by predetermined or programmable logic in an on-board programmable logic controller, a microcomputer, an industrial computer or the like. Control may also be accomplished for each member in the consist from the lead hybrid locomotive, or from the lead hybrid locomotive to the adjacent hybrid locomotive and then daisy-chained from each neighboring member of the consist to the next utilizing predetermined or programmable logic in on-board programmable logic controllers, microcomputers, industrial computers or the like. Control may be by any number of communication methods such as for example, by hard wire from locomotive to locomotive, radio telemetry, other forms of wireless communication, and/or audio and/or video linkage telemetry.

In a preferred embodiment, a method is provided for managing the environmental states of a hybrid locomotive or consist of hybrid locomotives. The consist members can be any energy consuming and/or providing vehicles, such as a hybrid locomotive, a cabless hybrid locomotive, an energy storage tender car, and the like. In this configuration, at least one of the members is a hybrid locomotive including an energy storage unit for storing electrical energy, an engine for providing electrical energy to the energy storage unit or its traction motors and a regenerative braking system for some or all of its electrical energy to the energy storage unit. The consist members are interconnected by a communications link and may also be interconnected by a direct current power bus for exchanging electrical energy.

The method for controlling the energy allocations in a hybrid consist member was disclosed in U.S. patent application Ser. No. 11/070,848.

A number of variations and modifications of the invention can be used. As will be appreciated, it would be possible to provide for some features of the invention without providing others. For example, in one alternative embodiment, the various inventive features are applied to vehicles other than locomotives, such as cars, railroad cars, and trucks. The control logic set forth above may be implemented as a logic circuit, software, or as a combination of the two.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, for example for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A locomotive, comprising:
a receiver operable to receive a locating signal, the locating signal indicating a current spatial location of a selected locomotive and
a processor operable to (a) determine that the selected locomotive has entered, is entering, and/or is about to enter a spatial zone having at least one controlled parameter, the controlled parameter being at least one of a fuel combustion emissions level and noise level and (b) configure the operation of the selected locomotive to comply with the controlled parameter.

2. The locomotive of claim 1, wherein the controlled parameter is a fuel combustion emission level.

3. The locomotive of claim 1, wherein the controlled parameter is a noise level.

4. The locomotive of claim 1, wherein the locating signal is a Global Positioning System signal, a radio signal, a cell phone signal, a transponder signal, and a mechanical locator signal, wherein the locomotive is a hybrid locomotive having an energy storage unit, a prime mover, at least one traction motor, a dynamic braking system, and a regenerative braking system for recovering braking energy and providing the recovered braking energy to the energy storage unit and wherein the processor is further operable to (c) determine, from the locating signal, the current spatial location of the selected locomotive and (d) determine a state of charge of the energy storage unit.

5. The locomotive of claim 4, wherein the processor is further operable to:
(e) determine a projected energy consumption as the selected locomotive traverses a plurality of upcoming spatial zones; and
(f) based on the controlled parameter and the projected energy consumption over the plurality of upcoming spatial zones, select an operating mode, from among a plurality of operating modes, for the current zone.

6. The locomotive of claim 5, wherein the plurality of operating modes include at least the following modes:
(i) a first operating mode in which the prime mover of the selected locomotive is continuously deactivated and at least most of the energy to operate the at least one traction motor is removed from the energy storage unit and
(ii) a second operating mode in which the prime mover is at least one of (a) intermittently activated and deactivated and (b)(i) intermittently activated but not transmitting power and (ii) activated and transmitting power to provide energy to the energy storage unit and wherein at least most of the energy to operate the at least one traction motor is removed from the energy storage unit.

7. The locomotive of claim 6, wherein the plurality of operating modes further include at least the following modes:
(iii) a third operating mode in which the prime mover provides at least most of the energy required to operate the at least one traction motor, wherein energy is at least one of not removed and intermittently removed from the energy storage unit;
(iv) a fourth operating mode in which the prime mover and energy storage unit operate at or near each of the prime mover's and energy storage unit's respective power ratings; and
(v) a fifth operating mode in which the brakes of the selected locomotive are engaged and at least some of the energy provided to the energy storage unit is generated by regenerative braking, the fifth operating mode excluding the first, second, third, and fourth operating modes.

8. The locomotive of claim 6, wherein, in the first operating mode, the selected locomotive has at least one of an average hydrocarbon emissions level of no more than about 10% of a current applicable regulated level, an average carbon monoxide emissions level of no more than about 10% of the current applicable regulated level, an average nitrous oxides emissions level of no more than about 10% of the current applicable regulated level, an average sulfur dioxide emissions level of no more than about 10% of the current applicable regulated level, an average particulate emissions level of no more than about 10% of the current applicable regulated level, and an average power plant noise level of at least 6 dBa less than the current applicable regulated level and wherein, in the second operating mode, the selected locomotive has at least one of an average hydrocarbon emissions level of no more than about 50% of a current applicable regulated level, an average carbon monoxide emissions level of no more than about 50% of the current applicable regulated level, an average nitrous oxides emissions level of no more than about 50% of the current applicable regulated level, an average sulfur dioxide emissions level of no more than about 50% of the current applicable regulated level, an average particulate emissions level of no more than about 50% of the current applicable regulated level, and an average power plant noise level of at least 3 dBa less than the current applicable regulated level.

9. The locomotive of claim 8, wherein the first operating mode is selected when a state of charge of the energy storage unit is at least a specified level, wherein the second operating mode is selected when the state of charge of the energy storage unit is less than the specified level, wherein the third operating mode is selected for spatial zones having no controlled parameter, wherein the fourth operating mode is selected for a spatial zone requiring maximum acceleration of the selected locomotive, and wherein the fifth operating mode is selected when the selected locomotive is at least one of decelerating and traversing a decline.

10. The locomotive of claim 6, wherein the selected locomotive and a second locomotive are members of a consist, wherein the selected locomotive and second locomotive are positioned at different locations along the train, wherein the respective positions of the selected locomotive and second locomotive are separated by a plurality of unmotorized rail cars, wherein, at a selected time, the selected locomotive and second locomotive are located in different spatial zones having differing controlled parameters, and wherein the selected and second locomotives are in differing operating modes at the selected time.

11. The locomotive of claim 10, wherein the operating modes of the selected locomotive and second locomotive are determined by a common master controller.

12. The locomotive of claim 10, wherein the selected locomotive and second locomotive are in electrical communication with one another via a DC power bus, whereby electrical energy can be provided by the selected locomotive to the second locomotive to enable the second locomotive to operate in a selected operating mode.

13. The locomotive of claim 1, wherein the selected locomotive is a member of a consist, wherein a second member of the consist is located at a distance from the selected locomotive, and wherein the determining operation comprises the suboperations of:
(A1) determining a first location of the selected locomotive; and
(A2) based on the first location, determining a second location of the second member of the consist.

14. The locomotive of claim 1, wherein the selected locomotive comprises a plurality of prime movers and the configuring operation (b) comprises the suboperation of:
operating a first subset of the prime movers and not operating a second subset of the prime movers, wherein the first subset of prime movers complies with the controlled parameter.

15. The locomotive of claim 1, wherein operation (b) comprises the suboperations
(B1) determining a first operational profile for operating one or more engines of the selected locomotive over the current zone;
(B2) comparing the first operational profile with at least one historical profile used to control operation of one or more engines of the selected locomotive over the current zone; and
(B3) updating the first operational profile based on the at least one historical profile, wherein, in the comparing step, one or more descriptors are used to select the at least one historical profile and wherein the one or more descriptors are one or more of ambient temperature, ambient precipitation, ambient wind speed and direction, rail condition, train length, train weight, state of charge of an energy storage unit, maximum power available from an energy storage unit, maximum power available from a prime mover, specific fuel consumption of the prime mover, locomotive speed, locomotive acceleration, locomotive deceleration, total power usage, percent rail grade, and track curvature.

16. The locomotive of claim 1, wherein the processor is further operable to (c) determine a current ambient temperature in the current zone.

17. A method for operating a locomotive, comprising:
(a) receiving a locating signal, the locating signal indicating a current spatial location of a selected locomotive;
(b) determining that the selected locomotive has entered, is entering, and/or is about to enter a spatial zone having at least one controlled parameter, the controlled parameter being at least one of a fuel combustion emissions level and a noise level; and
(c) configuring the operation of the selected locomotive to comply with the controlled parameter.

18. The method of claim 17, wherein the controlled parameter is a fuel combustion emissions level.

19. The method of claim 17, wherein the controlled parameter is a noise level.

20. The method of claim 17, wherein the locating signal is from at least one of a Global Positioning System, a radio, a cell phone, a transponder and a mechanical locator situated along the track and wherein the selected locomotive is a hybrid locomotive having an energy storage unit, a prime mover, at least one traction motor, a dynamic braking system, and a regenerative braking system for recovering braking energy and providing the recovered braking energy to the energy storage unit and further comprising:
(f) determining, from the locating signal, the current spatial location of the selected locomotive; and
(g) determining a state of charge of the energy storage unit.

21. The method of claim 17, wherein the selected locomotive is a member of a consist, wherein the locating signal is associated with a location of a second member of the consist, and wherein the determining step comprises:
(i) determining a first location of the second member of the consist; and
(ii) based on the first location, determining a second location of the selected locomotive.

22. The method of claim 17, further comprising:
(g) determining a projected energy consumption as the selected locomotive traverses a plurality of upcoming spatial zones; and
(h) based on the controlled parameter and the projected energy consumption over the plurality of upcoming spatial zones, selecting an operating mode, from among a plurality of operating modes, for the current zone.

23. The method of claim 22, wherein the plurality of operating modes include at least the following modes:
(i) a first operating mode in which the prime mover of the selected locomotive is continuously deactivated and at least most of the energy to operate the at least one traction motor is removed from the energy storage unit and
(ii) a second operating mode in which the prime mover is at least one of (a) intermittently activated and deactivated and (b)(i) intermittently activated but not transmitting power and (ii) activated and transmitting power to provide energy to the energy storage unit and wherein at least most of the energy to operate the at least one traction motor is removed from the energy storage unit.

24. The method of claim 23, wherein the plurality of operating modes further include at least the following modes:
(iii) a third operating mode in which the prime mover provides at least most of the energy required to operate the at least one traction motor, wherein energy is at least one of not removed and intermittently removed from the energy storage unit;
(iv) a fourth operating mode in which the prime mover and energy storage unit operate at or near each of the prime mover's and energy storage unit's respective power ratings; and
(v) a fifth operating mode in which the dynamic brakes of the selected locomotive are engaged and at least some of the energy provided to the energy storage unit is generated by regenerative braking, the fifth operating mode excluding the first, second, third, and fourth operating modes.

25. The method of claim 23, wherein, in the first operating mode, the selected locomotive has at least one of an average hydrocarbon emissions level of no more than about 10% of a current applicable regulated level, an average carbon monoxide emissions level of no more than about 10% of the current applicable regulated level, an average nitrous oxides emissions level of no more than about 10% of the current applicable regulated level, an average sulfur dioxide emissions level of no more than about 10% of the current applicable regulated level, an average particulate emissions level of no more than about 10% of the current applicable regulated level, and an average power plant noise level of at least 6 dBa less than the current applicable regulated level and wherein, in the second operating mode, the selected locomotive has at least one of an average hydrocarbon emissions level of no more than about 50% of a current applicable regulated level, an average carbon monoxide emissions level of no more than about 50% of the current applicable regulated level, an average nitrous oxides emissions level of no more than about 50% of the current applicable regulated level, an average sulfur dioxide emissions level of no more than about 50% of the current applicable regulated level, an average particulate emissions level of no more than about 50% of the current applicable regulated level, and an average power plant noise level of at least 3 dBa less than the current applicable regulated level.

26. The method of claim 25, wherein the first operating mode is selected when a state of charge of the energy storage unit is at least a specified level, wherein the second operating mode is selected when the state of charge of the energy storage unit is less than the specified level, wherein the third operating mode is selected for spatial zones having no controlled parameter, wherein the fourth operating mode is selected for a spatial zone requiring maximum acceleration of the selected locomotive, and wherein the fifth operating mode is selected for the selected locomotive when the selected locomotive is at least one of decelerating and traversing a decline.

27. The method of claim 23, wherein the selected locomotive and a second locomotive are members of a consist, wherein the selected locomotive and second locomotive are positioned at different locations along the train, wherein the respective positions of the selected locomotive and second locomotive are separated by a plurality of unmotorized rail cars, wherein, at a selected time, the selected locomotive and second locomotive are located in different spatial zones having differing controlled parameters, and wherein the selected and second locomotives are in differing operating modes at the selected time.

28. The method of claim 27, wherein the selected locomotive and second locomotive select autonomously their respective operating modes.

29. The method of claim 27, wherein the selected locomotive and second locomotive are in electrical communication with one another via a DC power bus, whereby electrical energy can be provided by the selected locomotive to the second locomotive to enable the second locomotive to operate in a selected operating mode.

30. The method of claim 17, wherein the selected locomotive comprises a plurality of prime movers and the configuring step (c) comprises:
operating a first subset of the prime movers and not operating a second subset of the prime movers, wherein the first subset of prime movers complies with the controlled parameter.

31. The method of claim 17, wherein step (c) comprises the substeps:
(i) determining a first operational profile for operating one or more engines of the selected locomotive over the current zone;
(ii) comparing the first operational profile with at least one historical profile used to control operation of one or more engines of the selected locomotive over the current zone; and
(iii) updating the first operational profile based on the at least one historical profile.

32. The method of claim 31, wherein, in the comparing step, one or more descriptors are used to select the at least one historical profile and wherein the one or more descriptors are one or more of ambient temperature, ambient precipitation, ambient wind speed and direction, rail condition, train length, train weight, state of charge of an energy storage unit, maximum power available from an energy storage unit, maximum power available from a prime mover, specific fuel consumption of the prime mover, locomotive speed, locomotive acceleration, locomotive deceleration, total power usage, percent rail grade, and track curvature.

33. The method of claim 17, further comprising:
(d) determining a current ambient temperature in the current zone.

34. A computer readable medium comprising executable instructions for performing the steps of claim 17.

35. A logic circuit operable to perform the steps of claim 17.

* * * * *